US011955262B2

(12) United States Patent
Lee et al.

(10) Patent No.: US 11,955,262 B2
(45) Date of Patent: Apr. 9, 2024

(54) INDUCTOR AND EMI FILTER INCLUDING THE SAME

(71) Applicant: LG INNOTEK CO., LTD., Seoul (KR)

(72) Inventors: Mi Jin Lee, Seoul (KR); Ji Yeon Song, Seoul (KR); Yu Seon Kim, Seoul (KR); Jong Wook Lim, Seoul (KR); Seok Bae, Seoul (KR); Sang Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 241 days.

(21) Appl. No.: 17/673,245

(22) Filed: Feb. 16, 2022

(65) Prior Publication Data

US 2022/0199305 A1 Jun. 23, 2022

Related U.S. Application Data

(63) Continuation of application No. 16/473,863, filed as application No. PCT/KR2018/000041 on Jan. 2, 2018, now Pat. No. 11,289,252.

(30) Foreign Application Priority Data

Jan. 3, 2017 (KR) ........................ 10-2017-0000745
Sep. 5, 2017 (KR) ........................ 10-2017-0113223

(51) Int. Cl.
*H01F 1/34* (2006.01)
*H01F 3/04* (2006.01)
(Continued)

(52) U.S. Cl.
CPC ................. *H01F 1/34* (2013.01); *H01F 3/04* (2013.01); *H01F 3/08* (2013.01); *H01F 17/0013* (2013.01);
(Continued)

(58) Field of Classification Search
CPC ..... H01F 1/34; H01F 3/04; H01F 3/08; H01F 17/0013; H01F 17/06; H01F 27/245;
(Continued)

(56) References Cited

U.S. PATENT DOCUMENTS

2005/0258705 A1 11/2005 Berwald
2006/0125586 A1* 6/2006 Lee .......................... H01F 3/10
336/83

(Continued)

FOREIGN PATENT DOCUMENTS

CN 1790563 6/2006
CN 102368424 3/2012

(Continued)

OTHER PUBLICATIONS

Japanese Office Action dated Jan. 17, 2022 issued in Application 2019-532996.

(Continued)

*Primary Examiner* — Shawki S Ismail
*Assistant Examiner* — Kazi S Hossain
(74) *Attorney, Agent, or Firm* — KED & Associates LLP

(57) ABSTRACT

An inductor includes a first magnetic body having a toroidal shape and having a ferrite; and a second magnetic body configured to be different from the first magnetic body and including a metal ribbon, wherein the second magnetic body includes an outer magnetic body disposed on an outer circumferential surface of the first magnetic body and an inner magnetic body disposed on an inner circumferential surface of the first magnetic body, and each of the outer magnetic body and inner magnetic body is wound in a plurality of layers in a circumferential direction of the first magnetic body.

20 Claims, 35 Drawing Sheets

(51) Int. Cl.
*H01F 3/08* (2006.01)
*H01F 17/00* (2006.01)
*H01F 17/06* (2006.01)
*H01F 27/245* (2006.01)
*H01F 41/02* (2006.01)

(52) U.S. Cl.
CPC .......... *H01F 17/06* (2013.01); *H01F 27/245* (2013.01); *H01F 41/0213* (2013.01); *H01F 2017/065* (2013.01)

(58) Field of Classification Search
CPC .......... H01F 41/0213; H01F 2017/065; H01F 2017/0093; H01F 27/25; H01F 1/344; H01F 17/062; H01F 27/255; H01F 2003/106
USPC .......................................... 336/229, 221, 83
See application file for complete search history.

(56) References Cited

U.S. PATENT DOCUMENTS

| | | | | |
|---|---|---|---|---|
| 2009/0051478 | A1* | 2/2009 | Lee | H01F 3/10 336/212 |
| 2011/0001595 | A1* | 1/2011 | Kudo | H01F 27/263 336/192 |
| 2014/0028431 | A1 | 1/2014 | Lee et al. | |
| 2014/0125446 | A1* | 5/2014 | Saboori | H01F 5/00 336/229 |
| 2015/0162118 | A1 | 6/2015 | Kato | |
| 2016/0148748 | A1* | 5/2016 | Shen | H01F 17/062 29/605 |
| 2018/0183401 | A1* | 6/2018 | Wang | H01F 19/04 |

FOREIGN PATENT DOCUMENTS

| | | | |
|---|---|---|---|
| CN | 102376417 | | 3/2012 |
| CN | 104620336 | | 5/2015 |
| CN | 105074843 | A | 11/2015 |
| CN | 105321669 | | 2/2016 |
| DE | 975437 | | 11/1961 |
| EP | 2 958 116 | A1 | 12/2015 |
| JP | S49-132521 | | 12/1974 |
| JP | S56-34314 | | 4/1981 |
| JP | S62-7101 | | 1/1987 |
| JP | H03-62607 | | 3/1991 |
| JP | H03-150815 | A | 6/1991 |
| JP | H03-198312 | | 8/1991 |
| JP | H04-318906 | A | 11/1992 |
| JP | H04-356906 | A | 12/1992 |
| JP | H05-308027 | A | 11/1993 |
| JP | H07-22886 | A | 1/1995 |
| JP | H07-153613 | A | 6/1995 |
| JP | 3009686 | | 2/2000 |
| JP | 2000-228319 | | 8/2000 |
| JP | 2008-103716 | | 5/2008 |
| JP | 2011-155158 | A | 8/2011 |
| JP | 2012-015426 | | 1/2012 |
| JP | 2013-153090 | A | 8/2013 |
| JP | 2015-515143 | | 5/2015 |
| JP | 2015-188085 | | 10/2015 |
| KR | 10-1999-0031600 | | 5/1999 |
| KR | 10-2010-0009381 | | 1/2010 |
| KR | 10-2010-0128078 | | 12/2010 |
| KR | 10-2012-0114850 | | 10/2012 |
| KR | 10-2015-0143251 | | 12/2015 |
| WO | WO 2014/126220 | A1 | 8/2021 |

OTHER PUBLICATIONS

International Search Report dated Apr. 11, 2018 issued in Application No. PCT/KR2018/000041.
Korean Office Action dated Aug. 24, 2019 issued in Application No. 10-2017-0113223.
European Search Report dated Jul. 13, 2020 issued in Application No. 18735827.0.
Chinese Office Action dated Nov. 23, 2020 issued in Application No. 201880005850.7.
U.S. Office Action dated Jul. 20, 2021 issued in parent U.S. Appl. No. 16/473,863.
Extended European Search Report dated Dec. 10, 2021 issued in Application 21182959.3.
Japanese Office Action dated Aug. 8, 2023, issued in Application No. 2022-133463.

* cited by examiner

FIG. 6A
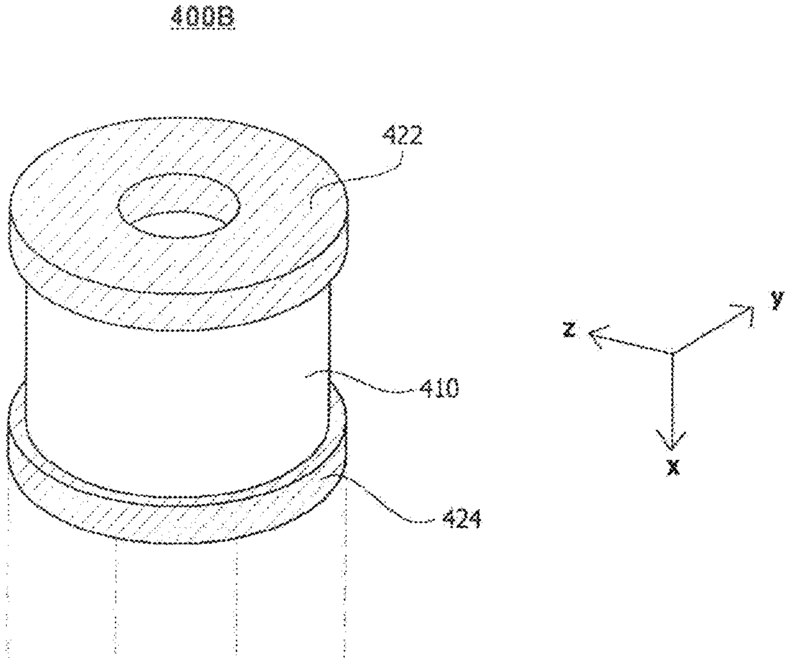
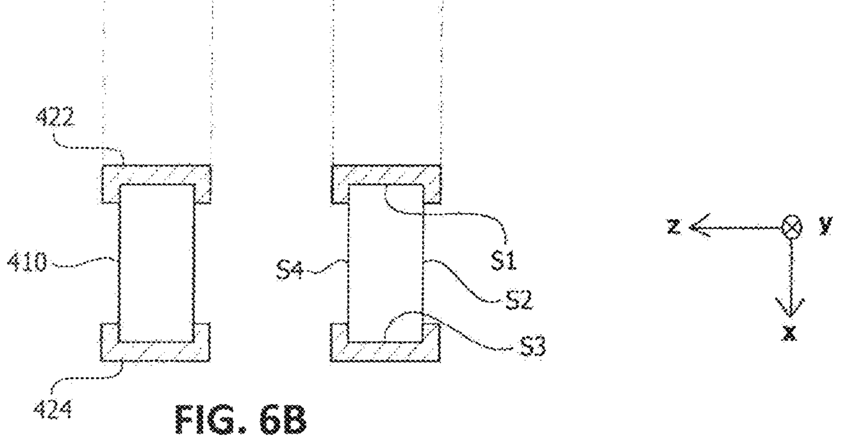
FIG. 6B

800B

FIG. 12A
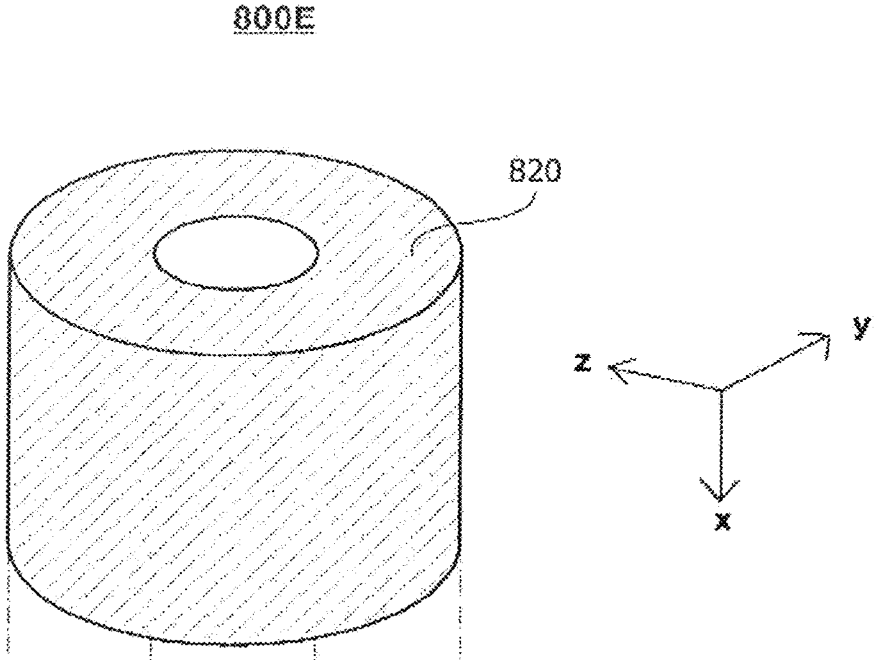
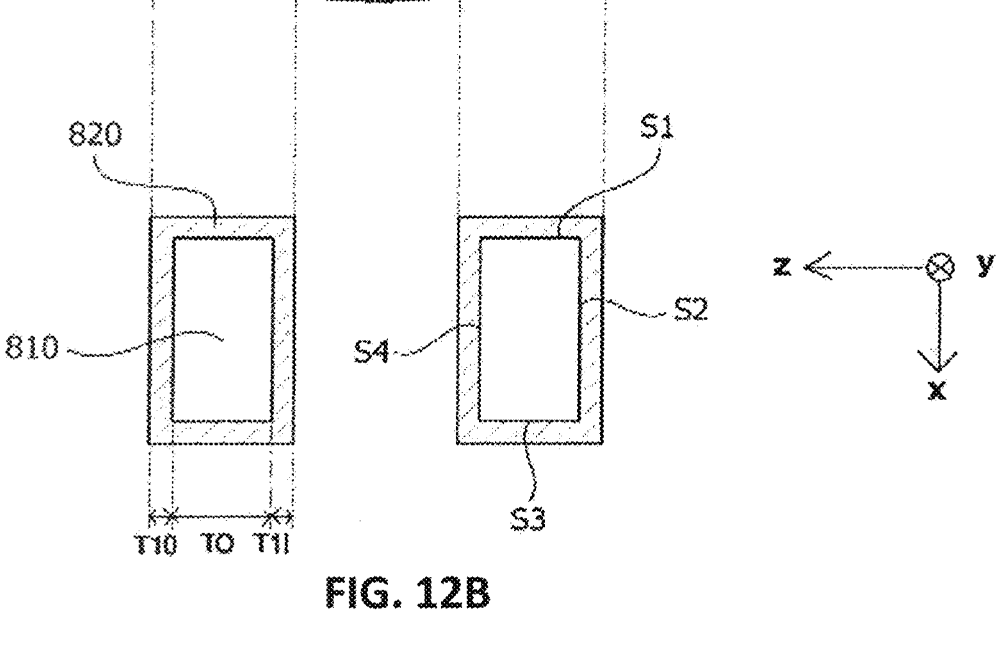
FIG. 12B

INDUCTOR AND EMI FILTER INCLUDING THE SAME

CROSS-REFERENCE TO RELATED APPLICATIONS

This application is a Continuation application of U.S. patent application Ser. No. 16/473,863 filed Jun. 26, 2019, which is a U.S. National Stage Application under 35 U.S.C. § 371 of PCT Application No. PCT/KR2018/000041, filed Jan. 2, 2018, which claims priority to Korean Patent Application No's. 10-2017-0000745, filed Jan. 3, 2017 and 10-2017-0113223, filed Sep. 5, 2017, whose entire disclosures are hereby incorporated by reference.

BACKGROUND

1. Field

Embodiments relate to an inductor and an EMI filter including the same.

2. Background

An inductor is one of electronic components that are used in printed circuit boards, and may be applied to resonance circuits, filter circuits, power circuits, etc. due to the electromagnetic characteristics thereof.

Recently, various electronic devices such as communication devices or display devices have been developed to become smaller and thinner, and according to this trend, an inductor used in these electronic devices is required to be smaller, thinner and highly efficient.

An electromagnetic interference (EMI) filter used in a power board serves to transmit a signal necessary for the operation of a circuit and to remove noise.

FIG. 1 is a block diagram showing a construction in which a general power board equipped with an EMI filter is connected to a power source and a load.

Noise transmitted from the power board of the EMI filter shown in FIG. 1 may be largely classified into radiative noise of 30 MHz to 1 GHz radiated from the power board and conductive noise of 150 kHz to 30 MHz conducted via a power line.

A conductive noise transmission mode may include a differential mode and a common mode. Among these modes, common-mode noise travels and returns along a large loop. Thus, the common-mode noise may affect electronic devices that are located far away even when the amount thereof is small. Such common-mode noise is generated by impedance imbalance of a wiring system and becomes remarkable at a high frequency.

In order to remove common-mode noise, an inductor that is applied to the EMI filter shown in FIG. 1 generally uses a toroidal-shaped magnetic core that includes a Mn—Zn-based ferrite material. Since Mn—Zn-based ferrite has a high magnetic permeability within a range from 100 kHz to 1 MHz, it is capable of effectively removing common-mode noise.

As the power of the power board, to which the EMI filter is applied, is higher, a magnetic core having a higher inductance is required. To this end, a magnetic core having a high magnetic permeability μ, e.g. a magnetic core having relative permeability μ of 10,000 H/m to 15,000 H/m or higher, is required. However, Mn—Zn-based ferrite having such a high magnetic permeability is expensive. Further, because Mn—Zn-based ferrite has a low core loss ratio due to the material property thereof, the noise removal efficiency within a band of 6 MHz to 30 MHz is low.

BRIEF DESCRIPTION OF THE DRAWINGS

The embodiments will be described in detail with reference to the following drawings in which like reference numerals refer to like elements wherein:

FIGS. 6A and 6B are, respectively, a coupled perspective view and a partial cross-sectional view of another embodiment of the magnetic core shown in FIG. 2.

FIGS. 12A and 12B are, respectively, a coupled perspective view and a partial cross-sectional view of still another embodiment of the magnetic core shown in FIG. 2.

DETAILED DESCRIPTION

Figure 1:
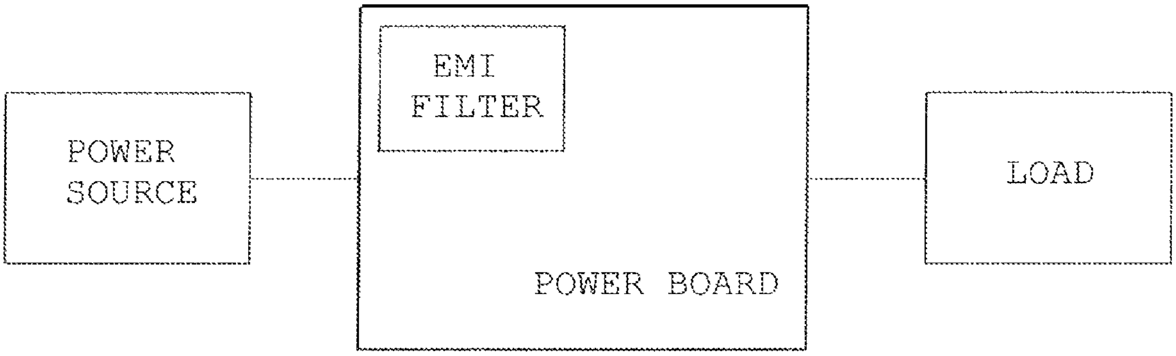
FIG. 1 is a block diagram showing a construction in which a general power board equipped with an EMI filter is connected to a power source and a load.

Embodiments provide an inductor, which is capable of receiving high power and which is compact and has excellent noise removal performance and a constant inductance, and an EMI filter including the same.

An inductor according to an embodiment includes a first magnetic body having a toroidal shape, the first magnetic body including ferrite, and a second magnetic body configured to be different from the first magnetic body, the second magnetic body including a metal ribbon, wherein the second magnetic body includes an outer magnetic body disposed on the outer circumferential surface of the first magnetic body and an inner magnetic body disposed on the inner circumferential surface of the first magnetic body, and each of the outer magnetic body and the inner magnetic body is wound in multiple layers in a circumferential direction of the first magnetic body.

For example, the metal ribbon included in the outer magnetic body and the inner magnetic body may be a Fe-based nanocrystalline metal ribbon.

For example, the thickness of the first magnetic body may be greater than the thickness of each of the outer magnetic body and the inner magnetic body in a diameter direction of the first magnetic body.

For example, a thickness ratio between the inner magnetic body and the first magnetic body in the diameter direction may range from 1:80 to 1:16, and a thickness ratio between the outer magnetic body and the first magnetic body in the diameter direction may range from 1:80 to 1:16.

For example, the magnetic permeability of each of the outer magnetic body and the inner magnetic body may be different from the magnetic permeability of the first magnetic body, the thickness of each of the outer magnetic body and the inner magnetic body may be less than the thickness of the first magnetic body in the diameter direction of the first magnetic body, and the saturation magnetic flux density of each of the outer magnetic body and the inner magnetic body may be greater than the saturation magnetic flux density of the first magnetic body.

For example, the thickness of the outer magnetic body and the thickness of the inner magnetic body may be the same as each other in the diameter direction.

An EMI filter according to another embodiment includes an inductor and a capacitor, wherein the inductor includes a first magnetic body having a toroidal shape, the first magnetic body including ferrite, a second magnetic body configured to be different from the first magnetic body, the second magnetic body including a metal ribbon, the second magnetic body including an outer magnetic body disposed on the outer circumferential surface of the first magnetic body and an inner magnetic body disposed on the inner circumferential surface of the first magnetic body, and coils wound around the first magnetic body, the outer magnetic body and the inner magnetic body, and each of the outer magnetic body and the inner magnetic body is wound in multiple layers in a circumferential direction of the first magnetic body.

For example, a thickness ratio between the inner magnetic body and the first magnetic body in a diameter direction of the first magnetic body may range from 1:80 to 1:16, and a thickness ratio between the outer magnetic body and the first magnetic body in the diameter direction may range from 1:80 to 1:16.

For example, the thickness of each of the inner magnetic body and the outer magnetic body in the diameter direction may range from 190 μm to 210 μm.

An inductor according to embodiments and an EMI filter including the same have excellent noise removal performance over a wide frequency band, a reduced size, a large power receiving capacity, and improved performance of removing conductive noise including common-mode noise and differential-mode noise, and is capable of adjusting the noise removal performance for each frequency band.

Exemplary embodiments can be variously changed and embodied in various forms, in which illustrative embodiments are shown. However, exemplary embodiments should not be construed as being limited to the embodiments set forth herein and any changes, equivalents or alternatives which are within the spirit and scope of the embodiments should be understood as falling within the scope of the embodiments.

It will be understood that although the terms “first”, “second”, etc. may be used herein to describe various elements, these elements should not be limited by these terms. These terms are only used to distinguish one element from another element. For example, a first element may be termed a second element and a second element may be termed a first element without departing from the teachings of the embodiments. The term "and/or" includes any and all combinations of one or more of the associated listed items.

It will be understood that when an element is referred to as being "connected to" or "coupled to" another element, it may be directly connected or coupled to the other element or intervening elements may be present. In contrast, when an element is referred to as being "directly connected to" or "directly coupled to" another element or layer, there are no intervening elements present.

In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. It will also be understood that criteria of on or under is on the basis of the drawing. The thickness or size of a layer (film), a region, a pattern, or a structure shown in the drawings may be exaggerated, omitted or schematically drawn for the convenience and clarity of explanation, and may not utterly reflect the actual size.

The terms used in the present specification are used for explaining a specific exemplary embodiment, not limiting the present inventive concept. Thus, the singular expressions in the present specification include the plural expressions unless clearly specified otherwise in context. In the specification, the terms "comprising" or "including" shall be understood to designate the presence of particular features, numbers, steps, operations, elements, parts, or combinations thereof but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. The same elements are denoted by the same reference numerals in the drawings, and a repeated explanation thereof will not be given. Embodiments will be described using a Cartesian coordinate system. However, other different coordinate systems may be used. In the drawings, an x-axis, a y-axis, and a z-axis of the Cartesian coordinate system are perpendicular to each other. However, the disclosure is not limited thereto. The x-axis, the y-axis, and the z-axis may intersect each other.

Figure 2:
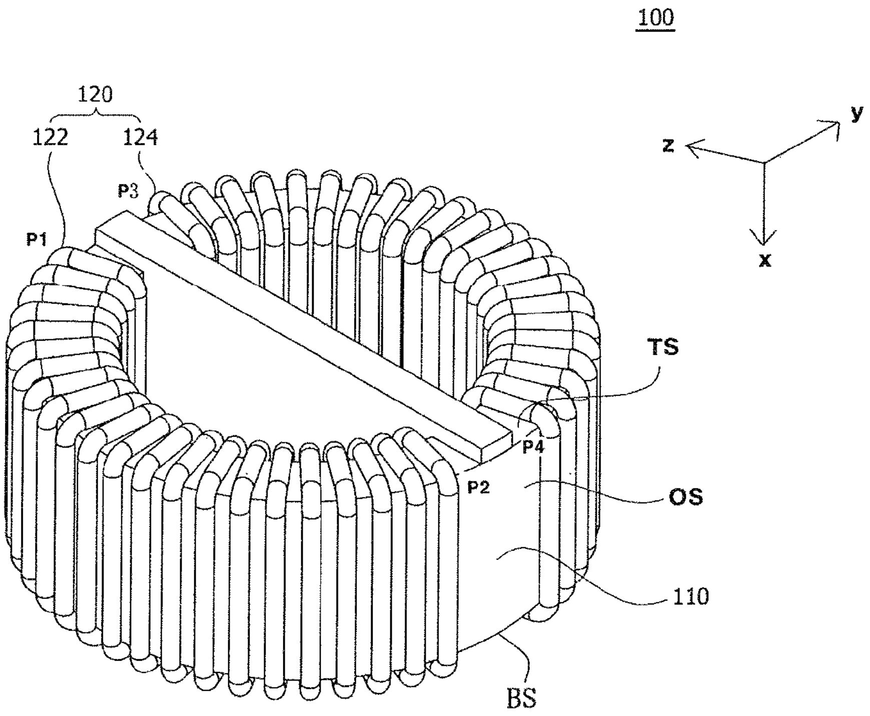
FIG. 2 is a perspective view of an inductor according to an embodiment.

FIG. 2 is a perspective view of an inductor 100 according to an embodiment.

Referring to FIG. 2, the inductor 100 may include a magnetic core 110 and a coil 120 wound around the magnetic core 110.

The magnetic core 110 may have a toroidal shape, and the coil 120 may include a first coil 122 wound around the magnetic core 110 and a second coil 124 wound so as to be opposite the first coil 122. Each of the first coil 122 and the second coil 124 may be wound around a top surface TS, a bottom surface BS and a side surface OS of the toroidal-shaped magnetic core 110.

A bobbin (not illustrated) for insulating the magnetic core 110 and the coil 120 may be further provided between the magnetic core 110 and the coil 120.

The coil 120 may be configured as a conductive wire coated on the surface thereof with an insulating material. The conductive wire coated on the surface thereof with an insulating material may include copper, silver, aluminum, gold, nickel, tin, or the like, and may have a circular-shaped or polygonal-shaped cross-section. However, the disclosure is not limited to any particular material of the conductive wire or to any particular shape of the cross-section of the conductive wire.

In the embodiment, the magnetic core 110 may include first and second magnetic bodies. The first and second magnetic bodies are mutually different, and the second magnetic body may be disposed on at least a portion of the surface of the first magnetic body. The magnetic core 110 may be embodied in various forms depending on the configuration in which the second magnetic body is disposed on the surface of the first magnetic body. That is, the second magnetic body may be disposed on at least a portion of the top surface, the bottom surface or the side surface of the first magnetic body.

Hereinafter, various embodiments 400A, 400B, 800A to 800E and 1400 of the magnetic core 110 shown in FIG. 2 will be described below with reference to the accompanying drawings.

Figure 3:
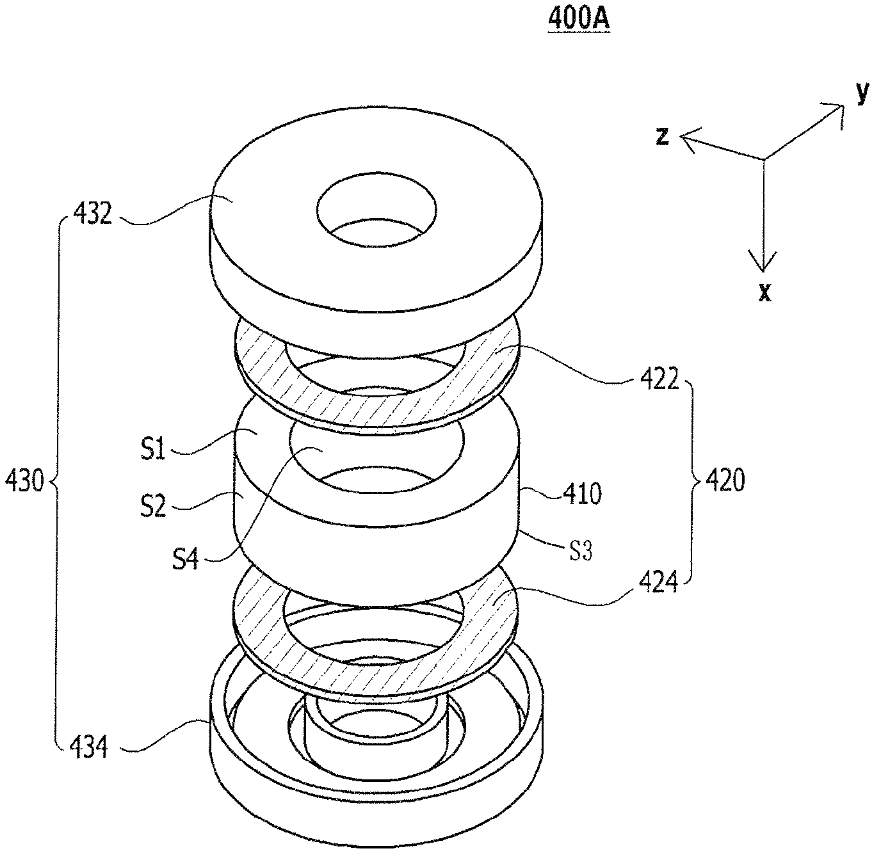
FIG. 3 is an exploded perspective view of an embodiment of the magnetic core shown in FIG. 2.
Figure 4A:
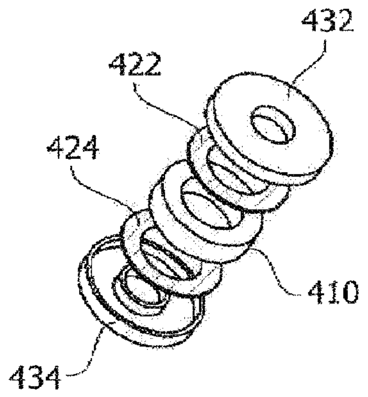
FIGS. 4A to 4D are perspective views showing a process of forming the magnetic core shown in FIG. 3.
Figure 4B:
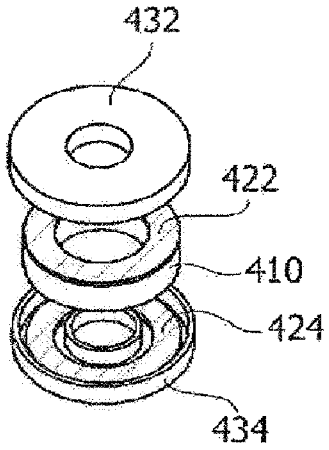
Figure 4C:
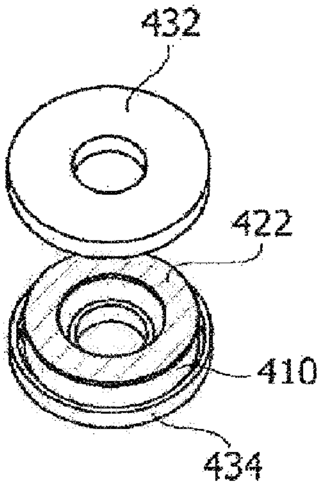
Figure 4D:
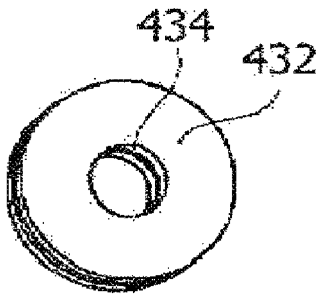
Figures 5A, 5B:
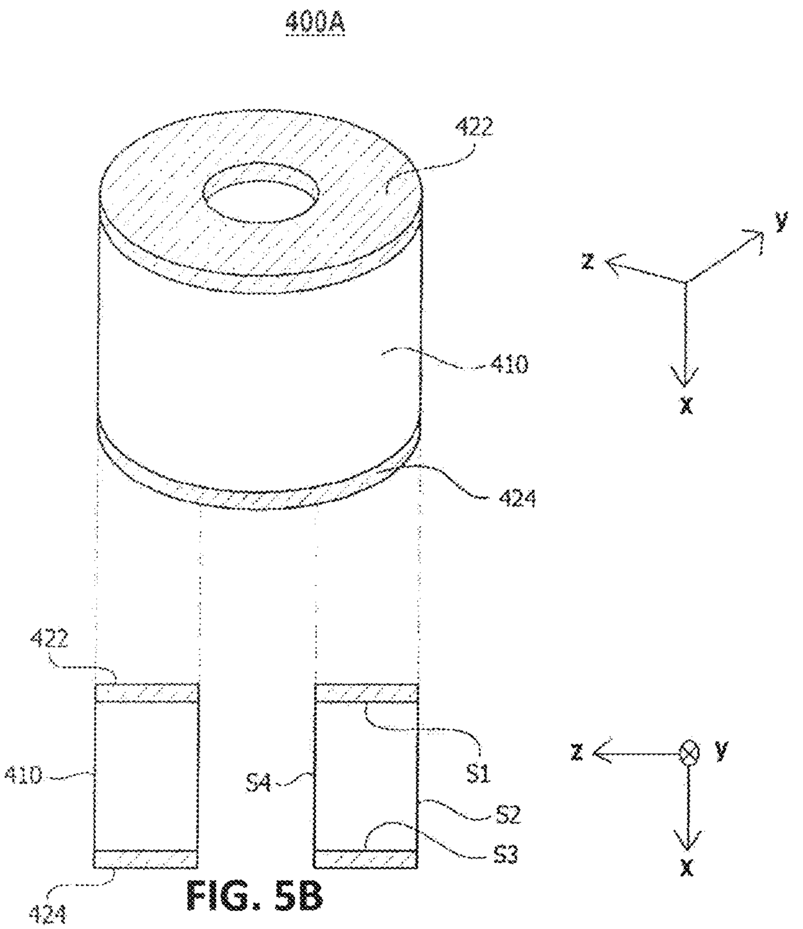
FIGS. 5A and 5B are, respectively, a coupled perspective view and a partial cross-sectional view of the magnetic core shown in FIG. 3, from which the illustration of a bobbin is omitted.

FIG. 3 is an exploded perspective view of an embodiment 400A of the magnetic core 110 shown in FIG. 2, FIGS. 4A to 4D are perspective views showing a process of forming the magnetic core 400A shown in FIG. 3, and FIGS. 5A and 5B are, respectively, a coupled perspective view and a partial cross-sectional view of the magnetic core 400A shown in FIG. 3, from which the illustration of a bobbin 430 is omitted.

Referring to FIGS. 3 to 5, an embodiment 400A of the magnetic core may include a first magnetic body 410 and a second magnetic body 420.

The first magnetic body 410 and the second magnetic body 420 may differ in magnetic permeability. The second magnetic body 420 may have a higher saturation magnetic flux density than the first magnetic body 410. Here, the magnetic permeability may be expressed by the following Equation 1.

$$\mu=\mu_0\mu_s \quad \text{[Equation 1]}$$

Here, μ represents magnetic permeability, μ0 represents magnetic permeability in a vacuum (or air), which is 4π×10−7, μs represents relative permeability, and the unit of each of μ, μ0 and μs is [Henry/meter] (hereinafter referred to as H/m).

Referring to Equation 1, the difference in magnetic permeability between the first magnetic body 410 and the second magnetic body 420 may mean that the first magnetic body 410 and the second magnetic body 420 have different values of relative permeability.

For example, the first magnetic body 410 may include ferrite, and the second magnetic body 420 may include a metal ribbon. Here, the relative permeability μs of the ferrite may range from 2,000 H/m to 15,000 H/m, and the relative permeability μs of the metal ribbon may range from 100,000 H/m to 150,000 H/m. For example, the ferrite may be Mn—Zn-based ferrite, and the metal ribbon may be a Fe-based nanocrystalline metal ribbon. The Fe-based nanocrystalline metal ribbon may be a nanocrystalline metal ribbon including Fe and Si.

Here, the nanocrystalline material is a material with a crystallite size of 10 nm to 100 nm.

The first magnetic body 410 may be manufactured by coating ferrite powder with a ceramic or polymer binder, insulating the ferrite powder coated with the ceramic or polymer binder, and molding the insulated ferrite powder coated with the ceramic or polymer binder at a high pressure. Alternatively, the first magnetic body 410 may be manufactured by stacking a plurality of ferrite sheets on one another, each of the sheets being formed by coating ferrite powder with a ceramic or polymer binder and insulating the ferrite powder coated with the ceramic or polymer binder. However, the disclosure is not limited to any particular method of forming the first magnetic body 410.

Each of the first magnetic body 410 and the second magnetic body 420 may have a toroidal shape. The second magnetic body 420 may include at least one of an upper magnetic body 422 or a lower magnetic body 424. The second magnetic body 420 is illustrated as including both the upper magnetic body 422 and the lower magnetic body 424 in FIGS. 3 to 5. However, the disclosure is not limited thereto. In another embodiment, the second magnetic body 420 may include only one of the upper magnetic body 422 and the lower magnetic body 424.

The upper magnetic body 422 may be disposed on the top surface S1 of the first magnetic body 410, and the lower magnetic body 424 may be disposed on the bottom surface S3 of the first magnetic body 410.

The thickness of the second magnetic body 420 in the x-axis direction may be less than the thickness of the first magnetic body 410 in the x-axis direction. That is, the thickness of each of the upper magnetic body 422 and the lower magnetic body 424 in the x-axis direction may be less than the thickness of the first magnetic body 410 in the x-axis direction. The magnetic permeability of the magnetic core 400A may be adjusted by adjusting at least one of a ratio of the thickness of the upper magnetic body 422 to the thickness of the first magnetic body 410 or a ratio of the thickness of the lower magnetic body 424 to the thickness of the first magnetic body 410. To this end, each of the upper magnetic body 422 and the lower magnetic body 424 may include a metal ribbon stacked in multiple layers.

The magnetic core 400A may further include a bobbin 430. The bobbin 430 may further include an upper bobbin 432 and a lower bobbin 434.

A method of forming the magnetic core 400A shown in FIG. 3 will be described below with reference to FIGS. 4A to 4D. However, the disclosure is not limited thereto. That is, the magnetic core 400A shown in FIG. 3 may be manufactured in a manner different from that shown in FIGS. 4A to 4D.

First, referring to FIG. 4A, the upper bobbin 432, the upper magnetic body 422, the first magnetic body 410, the lower magnetic body 424 and the lower bobbin 434 are prepared.

Subsequently, referring to FIG. 4B, the lower magnetic body 424 is adhered to the bottom of the lower bobbin 434, an adhesive is applied to each of the top surface S1 of the first magnetic body 410 and the bottom surface S3 of the first magnetic body 410, the upper magnetic body 422 is adhered to the top surface S1 of the first magnetic body 410, and the lower magnetic body 424 is adhered to the bottom surface S3 of the first magnetic body 410. Here, the adhesive may be an adhesive including at least one of epoxy-based resin, acrylic resin, silicon-based resin, or varnish. The bonding of the second magnetic body 422 and 424 to the first magnetic body 410, which is different from the second magnetic body 422 and 424, using an adhesive may prevent deterioration in performance due to physical vibration.

Subsequently, referring to FIG. 4C, the lower bobbin 434, to which the lower magnetic body 424 is adhered, and the first magnetic body 410 are assembled to each other.

Subsequently, referring to FIG. 4D, the upper bobbin 432 is assembled to the product shown in FIG. 4C.

As illustrated in FIG. 5, the embodiment 400A of the magnetic core is configured such that the upper magnetic body 422 is disposed on the top surface S1 of the first magnetic body 410 and such that the lower magnetic body 424 is disposed on the bottom surface S3 of the first magnetic body 410.

FIGS. 6A and 6B are, respectively, a coupled perspective view and a partial cross-sectional view of another embodiment 400B of the magnetic core 110 shown in FIG. 2.

Referring to FIGS. 6A and 6B, the magnetic core 400B may be configured such that the upper magnetic body 422 is disposed on one portion of the side surface S2 and S4 of the first magnetic body 410 and on the top surface S1 of the first magnetic body 410 and such that the lower magnetic body 424 is disposed on the opposite portion of the side surface S2 and S4 of the first magnetic body 410 and on the bottom surface S3 of the first magnetic body 410. The magnetic core 400B shown in FIG. 6 is the same as the magnetic core 400A shown in FIG. 5, except that the upper magnetic body 422 is disposed so as to extend from the top surface S1 of the first magnetic body 410 to the side surface S2 and S4 of the first magnetic body 410 and that the lower magnetic body 424 is disposed so as to extend from the bottom surface S3 of the first magnetic body 410 to the side surface S2 and S4 of the first magnetic body 410, and a duplicate explanation thereof will therefore be omitted.

With the above-described configuration, in which the magnetic core 400A and 400B includes the mutually different first and second magnetic bodies 410 and 420, it is possible to remove noise over a wide frequency band.

In the case in which each of the first magnetic body and the second magnetic body, included in the magnetic core 110 shown in FIG. 2, has a toroidal shape, the side surface of the first magnetic body, among the surfaces of the first magnetic body on which the second magnetic body is disposed, may be at least one of the outer circumferential surface or the inner circumferential surface of the first magnetic body. In this case, the second magnetic body included in the magnetic core 110 may be disposed on at least a portion of the top surface, the bottom surface, the inner circumferential surface or the outer circumferential surface of the first magnetic body. Still another embodiment of the magnetic core 110 will be described below with reference to the accompanying drawings.

Figures 7A, 7B:
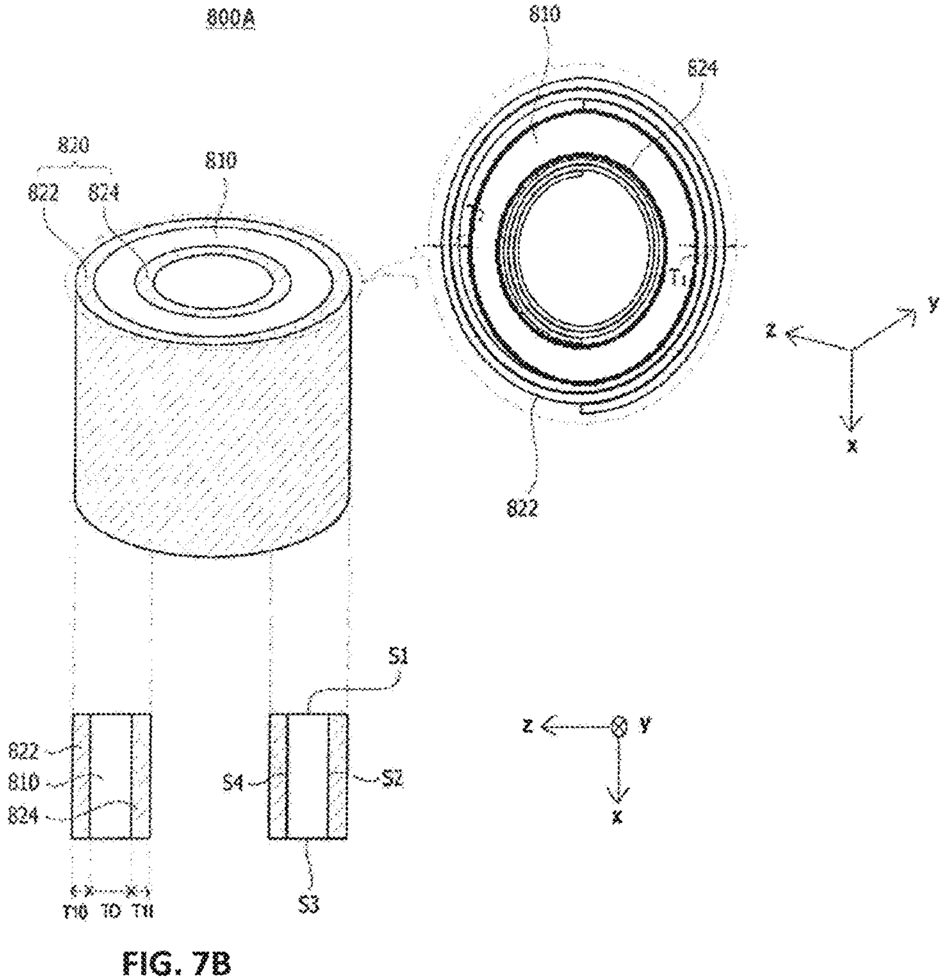
FIGS. 7A and 7B are, respectively, a coupled perspective view and a partial cross-sectional view of still another embodiment of the magnetic core shown in FIG. 2.
Figure 8A:
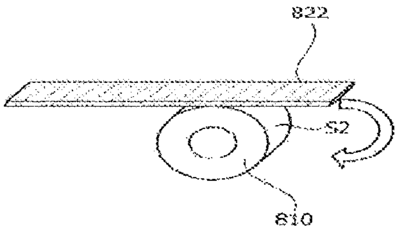
FIGS. 8A and 8B are perspective views showing a process of forming the magnetic core shown in FIGS. 7A and 7B.
Figure 8B:
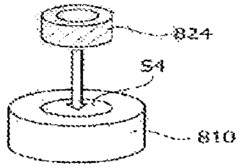

FIGS. 7A and 7B are, respectively, a coupled perspective view and a partial cross-sectional view of still another embodiment 800A of the magnetic core 110 shown in FIG. 2, and FIGS. 8A and 8B are perspective views showing a process of forming the magnetic core 800A shown in FIGS. 7A and 7B.

Referring to FIGS. 7A to 7B, the magnetic core 800A may include a first magnetic body 810 and a second magnetic body 820.

The first magnetic body 810 and the second magnetic body 820 may differ in magnetic permeability (or relative permeability), and the second magnetic body 820 may have a higher saturation magnetic flux density than the first magnetic body 810.

The first magnetic body 810 may include ferrite, and the second magnetic body 820 may include a metal ribbon. Here, the metal ribbon may be a thin metal strip formed of a metal material, i.e. a long and thin strip-shaped metal sheet. However, the disclosure is not limited thereto.

Here, the relative permeability μs of the ferrite may range from 2,000 H/m to 15,000 H/m, and exemplarily may be 10,000 H/m, and the relative permeability μs of the metal ribbon may range from 2,500 H/m to 150,000 H/m, exemplarily from 100,000 H/m to 150,000 H/m. For example, the ferrite may be Mn—Zn-based ferrite, and the metal ribbon may be a Fe-based nanocrystalline metal ribbon. The Fe-based nanocrystalline metal ribbon may be a nanocrystalline metal ribbon including Fe and Si.

As illustrated in FIGS. 7A AND 7B, each of the first magnetic body 810 and the second magnetic body 820 may have a toroidal shape. In this case, the second magnetic body 820 may include an outer magnetic body 822 and an inner magnetic body 824. The outer magnetic body 822 may be disposed on the outer circumferential surface S2 of the first magnetic body 810, and the inner magnetic body 824 may be disposed on the inner circumferential surface S4 of the first magnetic body 810.

The thickness TO of the first magnetic body 810 in the diameter direction thereof (e.g. the y-axis direction or the z-axis direction) may be greater than the thickness of the second magnetic body 820. That is, the thickness TO of the first magnetic body 810 in the y-axis direction (or the z-axis direction) may be greater than the thickness T1O and T1I of each of the outer magnetic body 822 and the inner magnetic body 824 in the y-axis direction (or the z-axis direction). The magnetic permeability of the magnetic core 800A may be adjusted by adjusting at least one of a ratio of the thickness T1O of the outer magnetic body 822 to the thickness TO of the first magnetic body 810 or a ratio of the thickness T1I of the inner magnetic body 824 to the thickness TO of the first magnetic body 810.

A method of forming the magnetic core 800A shown in FIGS. 7A and 7B will be described below with reference to FIGS. 8A and 8B. However, the disclosure is not limited thereto. That is, the magnetic core 800A shown in FIGS. 7A and 7B may be manufactured in a manner different from that shown in FIGS. 8A and 8B.

First, referring to FIG. 8A, a process of winding the outer magnetic body 822, which is a metal ribbon, around the outer circumferential surface S2 of the toroidal-shaped first magnetic body 810 is performed. Here, the winding process may include not only a process of winding a wire, i.e., an annular-shaped conductive wire having a diameter, around the surface of any object but also a process of winding a long and thin strip-shaped metal sheet, such as a metal ribbon, around the surface of any object.

Subsequently, referring to FIG. 8B, the inner magnetic body 824, which is a metal ribbon that has been wound in a toroidal shape in advance, is inserted into the hollow region in the first magnetic body 810. The inner magnetic body 824, which has been wound in advance, may be expanded so as to fit the size of the inner circumferential surface S4 of the first magnetic body 810.

The outer circumferential surface S2 of the first magnetic body 810 and the outer magnetic body 822 may be adhered to each other using an adhesive, and the inner circumferential surface S4 of the first magnetic body 810 and the inner magnetic body 824 may be adhered to each other using an adhesive. Here, the adhesive may be an adhesive including at least one of epoxy-based resin, acrylic resin, silicon-based resin, or varnish. The bonding of the mutually different magnetic bodies to each other using an adhesive may prevent deterioration in performance due to physical vibration.

At this time, at least one of the number of windings, the thickness T1O of the outer magnetic body 822 or the thickness T1I of the inner magnetic body 824 may be adjusted in order to obtain a desired magnetic permeability.

Each of the outer and inner magnetic bodies 822 and 824, as illustrated in FIG. 7(*a*), may include a metal ribbon that is wound multiple turns and is stacked in multiple layers. The thickness T1O and T1I and magnetic permeability of each of the outer and inner magnetic bodies 822 and 824 may be varied depending on the number of layers in which the metal ribbon is stacked. The noise removal performance of an EMI filter, to which the magnetic core 800A is applied, may be varied depending on the magnetic permeability of the magnetic core 800A. That is, the larger the thicknesses T1O and T1I of the outer and inner magnetic bodies 822 and 824, the higher the noise removal performance. Based on this principle, the number of layers in which the metal ribbon is stacked may be adjusted such that the thicknesses T1O and T1I of the outer and inner magnetic bodies 822 and 824, which are disposed on a region around which the coil 120 is wound, are greater than the thicknesses T1O and T1I of the outer and inner magnetic bodies 822 and 824, which are disposed on a region around which the coil 120 is not wound.

The number of layers of the metal ribbon may be adjusted by the number of windings, the starting point of winding and the ending point of winding. As illustrated in FIG. 8A, when the outer magnetic body 822, which is a metal ribbon, is wound one turn from the starting point of winding around the outer circumferential surface S2 of the first magnetic body 810, the outer magnetic body 822 may include a one-layered metal ribbon.

Alternatively, when the outer magnetic body 822 is wound two turns from the starting point of winding, the outer magnetic body 822 may include a two-layered metal ribbon. When the starting point of winding and the ending point of winding do not coincide with each other, for example, when the outer magnetic body 822 is wound one and a half turns from the starting point of winding, the outer magnetic body 822 includes a region in which a metal ribbon is stacked in a single layer and a region in which a metal ribbon is stacked in two layers.

Alternatively, when the outer magnetic body 822 is wound two and a half turns from the starting point of winding, the outer magnetic body 822 includes a region in which a metal ribbon is stacked in two layers and a region in which a metal ribbon is stacked in three layers. In this case, if the coil 120 is disposed on a region in which the number of layers in which a metal ribbon is stacked is larger, the noise removal performance of an EMI filter to which the magnetic core 800A according to the embodiment is applied may be further improved.

For example, in the case in which the magnetic core 800A has a toroidal shape and in which the first coil 122 and the second coil 124 are wound opposite each other around the magnetic core 800A, the first coil 122 may be disposed on a region in which the number of stacked layers of the outer magnetic body 822, which is disposed on the outer circumferential surface S2 of the first magnetic body 810, is relatively large, and the second coil 124 may be disposed on a region in which the number of stacked layers of the inner magnetic body 824, which is disposed on the inner circumferential surface S4 of the first magnetic body 810, is relatively large. Accordingly, each of the first coil 122 and the second coil 124 may be disposed on a region in which the number of stacked layers of a respective one of the outer and inner magnetic bodies 822 and 824 is relatively large, but may not be disposed on a region in which the number of stacked layers of a respective one of the outer and inner magnetic bodies 822 and 824 is relatively small, thereby achieving improved noise removal performance. FIG. 7A shows that the outer magnetic body 822 includes a first region and a second region. The first region includes a first number of winding layers in the outer magnetic body 822, and the second region includes a second number of winding layers in the outer magnetic body 822, and the second number of winding layers is greater than the first number of winding layers. FIG. 7A shows that the inner magnetic body 824 includes a third region and a fourth region. The third region includes a third number of winding layers in the inner magnetic body 824, and the fourth region includes a fourth number of winding layers in the inner magnetic body 824, and the fourth number of winding layers is greater than the third number of winding layers.

The outer magnetic body 822 and the inner magnetic body 824 may be formed of the same material as each other or may be formed of different materials from each other. The thicknesses T1O and T1I of the outer magnetic body 822 and the inner magnetic body 824 may be the same as each other or may be different from each other. However, the disclosure is not limited thereto. The outer magnetic body 822 and the inner magnetic body 824 may have different materials, different values of magnetic permeability, and/or different thicknesses T1O and T1I. Therefore, the magnetic permeability of the magnetic core 800A may have a wide range of values.

For example, in FIGS. 7A and 7B, the outer magnetic body 822 and the inner magnetic body 824 may be wound in the range from 5 turns to 25 turns, preferably from 10 turns to 20 turns.

Further, the thickness ratio (T1O:TO) between the outer magnetic body 822 and the first magnetic body 810 in the diameter direction (e.g. the y-axis direction or the z-axis direction) of the first magnetic body 810 may range from 1:80 to 1:16, preferably from 1:40 to 1:20. However, the disclosure is not limited thereto. In this case, the outer magnetic body 822 may be wound in the range from 5 turns to 25 turns, preferably from 10 turns to 20 turns.

Still further, the thickness ratio (T1I:TO) between the inner magnetic body 824 and the first magnetic body 810 in the diameter direction (e.g. the y-axis direction or the z-axis direction) of the first magnetic body 810 may range from 1:80 to 1:16, for example, from 1:40 to 1:20. However, the disclosure is not limited thereto. In this case, the inner magnetic body 824 may be wound in the range from 5 turns to 25 turns, preferably from 10 turns to 20 turns.

Figure 9A:
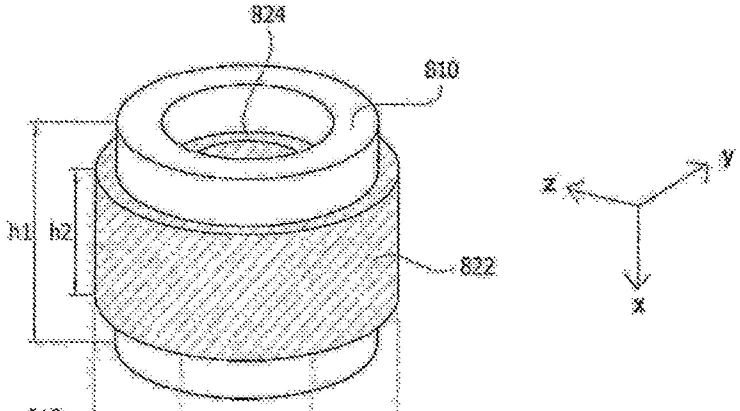
FIGS. 9A and 9B are, respectively, a coupled perspective view and a partial cross-sectional view of still another embodiment of the magnetic core shown in FIG. 2.
Figure 9B:
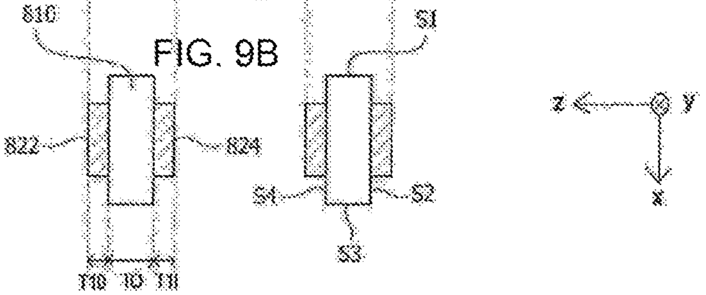

FIGS. 9A and 9B are, respectively, a coupled perspective view and a partial cross-sectional view of still another embodiment 800B of the magnetic core 110 shown in FIG. 2.

Referring to FIGS. 9A and 9B, the width (or the height h1) of the first magnetic body 810 in the x-axis direction may be greater than the width (or the height h2) of the outer and/or inner magnetic body 822 and 824 in the x-axis direction. To this end, in the process shown in FIGS. 8A and 8B, a metal ribbon having a width h2 less than the width h1 of the first magnetic body 810 may be wound to form the second magnetic body 820.

Referring to FIGS. 9A and 9B, the outer magnetic body 822 may not be disposed on the boundary between the top surface S1 and the outer circumferential surface S2 of the first magnetic body 810 and the boundary between the bottom surface S3 and the outer circumferential surface S2 of the first magnetic body 810. The inner magnetic body 824 may not be disposed on the boundary between the top surface S1 and the inner circumferential surface S4 of the first magnetic body 810 and the boundary between the bottom surface S3 and the inner circumferential surface S4 of the first magnetic body 810. However, the disclosure is not limited thereto. The second magnetic body 820 may not be disposed on at least one of the boundary between the top surface S1 and the outer circumferential surface S2 of the first magnetic body 810, the boundary between the top surface S1 and the inner circumferential surface S4 of the first magnetic body 810, the boundary between the bottom surface S3 and the outer circumferential surface S2 of the first magnetic body 810, or the boundary between the bottom surface S3 and the inner circumferential surface S4 of the first magnetic body 810.

As illustrated in FIGS. 9A and 9B, in the case in which the second magnetic body 820 is disposed on the surface of the first magnetic body 810, the second magnetic body 822 and 824 may be prevented from cracking along at least one of the boundary between the top surface S1 and the outer circumferential surface S2 of the first magnetic body 810, the boundary between the bottom surface S3 and the outer circumferential surface S2 of the first magnetic body 810, the boundary between the top surface S1 and the inner circumferential surface S4 of the first magnetic body 810, or the boundary between the bottom surface S3 and the inner circumferential surface S4 of the first magnetic body 810.

For example, in FIGS. 9A and 9B, the outer magnetic body 822 and the inner magnetic body 824 may be wound in the range from 5 turns to 25 turns, preferably from 10 turns to 20 turns.

Further, the thickness ratio (T1O:TO) between the outer magnetic body 822 and the first magnetic body 810 in the diameter direction (e.g. the y-axis direction or the z-axis direction) of the first magnetic body 810 may range from 1:80 to 1:16, for example, from 1:40 to 1:20. However, the disclosure is not limited thereto. In this case, the outer magnetic body 822 may be wound in the range from 5 turns to 25 turns, preferably from 10 turns to 20 turns.

Still further, the thickness ratio (T1I:TO) between the inner magnetic body 824 and the first magnetic body 810 in the diameter direction (e.g. the y-axis direction or the z-axis direction) of the first magnetic body 810 may range from 1:80 to 1:16, for example, from 1:40 to 1:20. However, the disclosure is not limited thereto. In this case, the inner magnetic body 824 may be wound in the range from 5 turns to 25 turns, preferably from 10 turns to 20 turns.

Figures 10A, 10B:
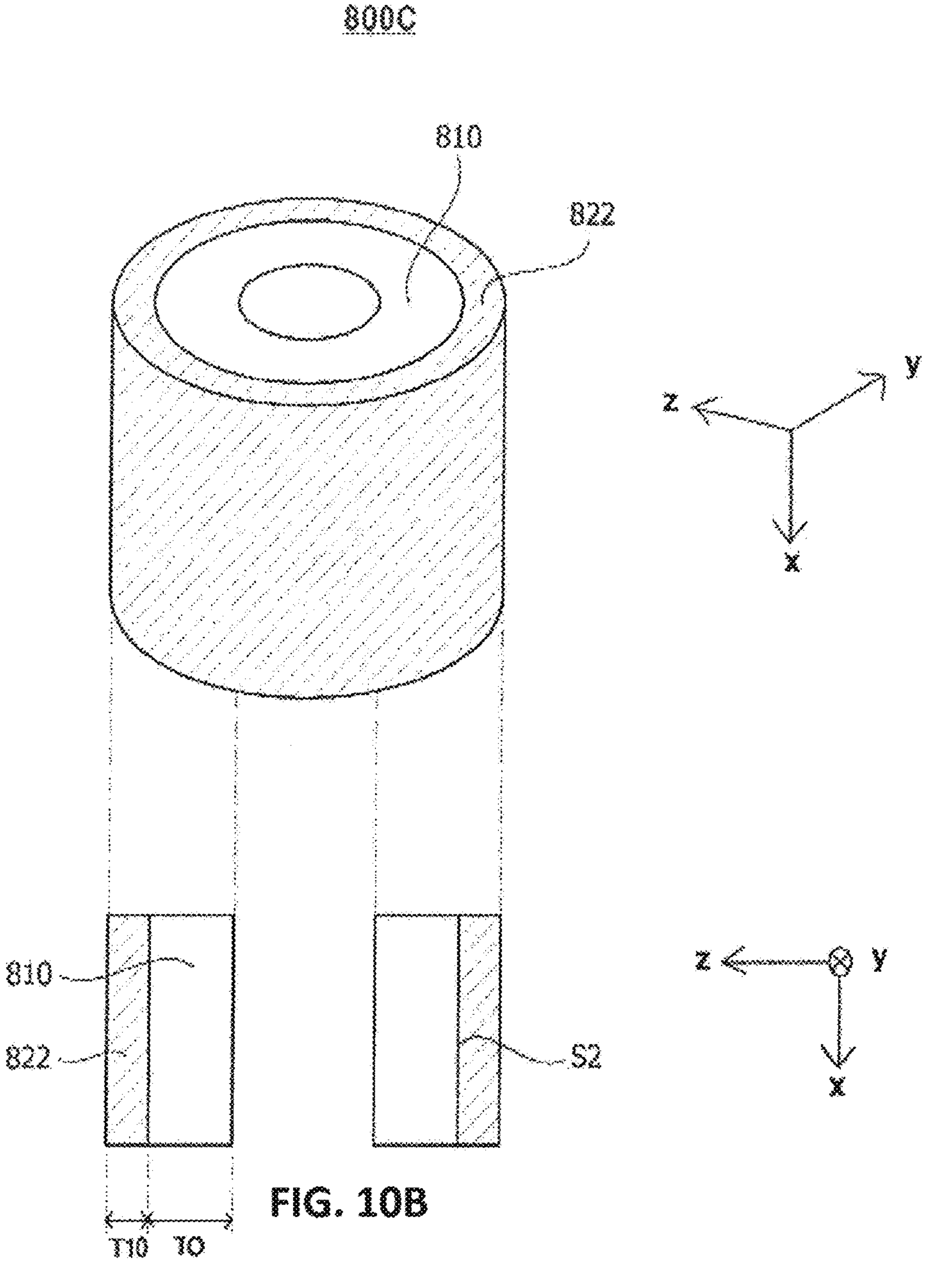
FIGS. 10A and 10B are, respectively, a coupled perspective view and a partial cross-sectional view of still another embodiment of the magnetic core shown in FIG. 2.

FIGS. 10A and 10B are, respectively, a coupled perspective view and a partial cross-sectional view of still another embodiment 800C of the magnetic core 110 shown in FIG. 2.

In the case of the magnetic core 800A and 800B shown in FIGS. 7 to 9, the second magnetic body 820 is disposed on the outer circumferential surface S2 and the inner circumferential surface S4 of the first magnetic body 810, but is not disposed on the top surface S1 or the bottom surface S3 of the first magnetic body 810. Unlike this, according to still another embodiment, as illustrated in FIGS. 12A and 12B, the second magnetic body 820 may be configured such that the second magnetic body 820 is disposed not only on the outer circumferential surface S2 and the inner circumferential surface S4 of the first magnetic body 810 but also on the top surface S1 and the bottom surface S3 of the first magnetic body 810. Except for this difference, the magnetic core 800E shown in FIGS. 12A and 12B is the same as the magnetic core 800A shown in FIGS. 7A and 7B, and a duplicate explanation thereof will therefore be omitted.

For example, in FIGS. 10A and 10B, the outer magnetic body 822 may be wound in the range from 5 turns to 25 turns, preferably from 10 turns to 20 turns.

Further, the thickness ratio (T1O:TO) between the outer magnetic body 822 and the first magnetic body 810 in the diameter direction (e.g. the y-axis direction or the z-axis direction) of the first magnetic body 810 may range from 1:80 to 1:16, for example, from 1:40 to 1:20. However, the disclosure is not limited thereto. In this case, the outer magnetic body 822 may be wound in the range from 5 turns to 25 turns, preferably from 10 turns to 20 turns.

Figures 11A, 11B:
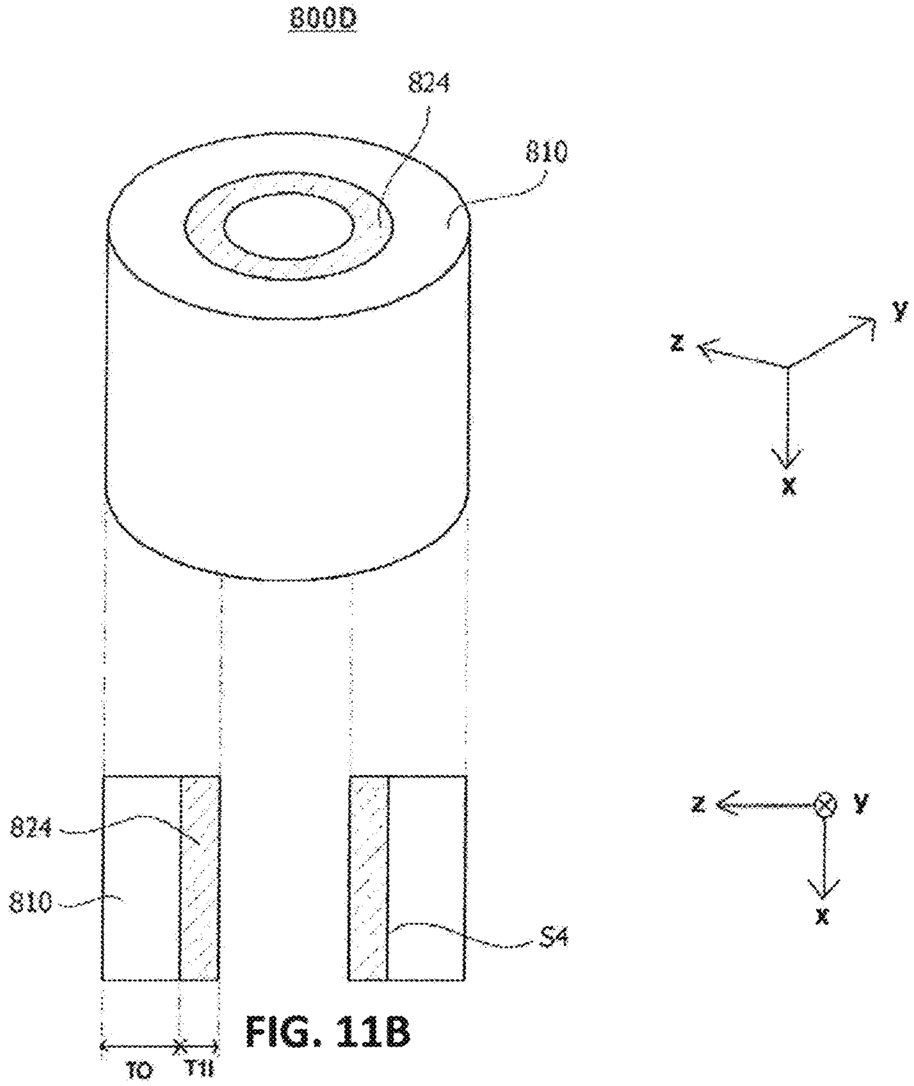
FIGS. 11A and 11B are, respectively, a coupled perspective view and a partial cross-sectional view of still another embodiment of the magnetic core shown in FIG. 2.

FIGS. 11A and 11B are, respectively, a coupled perspective view and a partial cross-sectional view of still another embodiment 800D of the magnetic core 110 shown in FIG. 2.

In the case of the magnetic core 800A and 800B shown in FIGS. 7 to 9, the second magnetic body 820 includes the outer magnetic body 822 and the inner magnetic body 824, which are respectively disposed on the outer circumferential surface S2 and the inner circumferential surface S4 of the first magnetic body 810. Unlike this, according to still another embodiment, as illustrated in FIGS. 11A and 11B, the magnetic core 800D may include the inner magnetic body 824, but may not include the outer magnetic body 822. The magnetic core 800D shown in FIGS. 11A and 11B is the same as the magnetic core 800A shown in FIGS. 7A and 7B, except that the outer magnetic body 822 is not included, and a duplicate explanation thereof will therefore be omitted.

For example, in FIGS. 11A and 11B, the inner magnetic body 824 may be wound in the range from 5 turns to 25 turns, preferably from 10 turns to 20 turns.

Further, the thickness ratio (T1I:TO) between the inner magnetic body 824 and the first magnetic body 810 in the diameter direction (e.g. the y-axis direction or the z-axis direction) of the first magnetic body 810 may range from 1:80 to 1:16, for example, from 1:40 to 1:20. However, the disclosure is not limited thereto. In this case, the inner magnetic body 824 may be wound in the range from 5 turns to 25 turns, preferably from 10 turns to 20 turns.

FIGS. 12A and 12B are, respectively, a coupled perspective view and a partial cross-sectional view of still another embodiment 800E of the magnetic core 110 shown in FIG. 2.

In the case of the magnetic core 800A and 800B shown in FIGS. 7 to 9, the second magnetic body 820 is disposed on the outer circumferential surface S2 and the inner circumferential surface S4 of the first magnetic body 810, but is not disposed on the top surface S1 or the bottom surface S3 of the first magnetic body 810. Unlike this, according to still another embodiment, as illustrated in FIGS. 12A and 12B, the magnetic core 800E may be configured such that the second magnetic body 820 is disposed not only on the outer circumferential surface S2 and the inner circumferential surface S4 of the first magnetic body 810 but also on the top surface S1 and the bottom surface S3 of the first magnetic body 810. Except for this difference, the magnetic core 800E shown in FIGS. 12A and 12B is the same as the magnetic core 800A shown in FIGS. 7A and 7B, and a duplicate explanation thereof will therefore be omitted.

For example, in FIGS. 12A and 12B, the second magnetic body 820, which is disposed on the outer circumferential surface S2 and the inner circumferential surface S4, may be wound in the range from 5 turns to 25 turns, preferably from 10 turns to 20 turns.

Further, the thickness ratio (T1O:TO) between the second magnetic body 820 disposed on the outer circumferential surface S2 and the first magnetic body 810 in the diameter direction (e.g., the y-axis direction or the z-axis direction) of the first magnetic body 810 may range from 1:80 to 1:16, for example, from 1:40 to 1:20. However, the disclosure is not limited thereto. In this case, the second magnetic body 820 disposed on the outer circumferential surface S2 may be wound in the range from 5 turns to 25 turns, preferably from 10 turns to 20 turns.

Still further, the thickness ratio (T1I:TO) between the second magnetic body 1420 disposed on the inner circumferential surface S4 and the first magnetic body 1410 in the diameter direction (e.g., the y-axis direction or the z-axis direction) of the first magnetic body 1410 may range from 1:80 to 1:16, for example, from 1:40 to 1:20. However, the disclosure is not limited thereto. In this case, the second magnetic body 1420 disposed on the inner circumferential surface S4 may be wound in the range from 5 turns to 25 turns, preferably from 10 turns to 20 turns. Alternatively, the second magnetic body 1420 disposed on the inner circumferential surface S4 may be stacked in a number within the range from 5 layers to 25 layers, preferably from 10 layers to 20 layers.

Still further, the second magnetic body may be disposed on each of the top surface S1 and the bottom surface S3 of the first magnetic body in the manner of being stacked in a number within the range from 5 layers to 25 layers, preferably from 10 layers to 20 layers, so as to have the same thickness as the second magnetic body disposed on the outer circumferential surface S2 or the inner circumferential surface S4 of the first magnetic body.

With the above-described configuration, in which the magnetic core 800A to 800E includes the mutually different first and second magnetic bodies 810 and 820 having different values of magnetic permeability, it is possible to remove noise over a wide frequency band.

In particular, compared to a toroidal-shaped magnetic core that is formed only of Mn—Zn-based ferrite, the magnetic core 400A, 400B, and 800A to 800E according to the embodiment is capable of effectively removing high-frequency noise by preventing concentration of the magnetic flux on the surface thereof and is capable of being applied to high-power products due to the low degree of internal saturation.

Further, the performance of the magnetic core 400A, 400B, and 800A to 800E may be adjusted by adjusting at least one of the magnetic permeability or the volume ratio of at least one of the first magnetic body 410 and 810 or the second magnetic body 420 and 820.

Figures 13A, 13B:
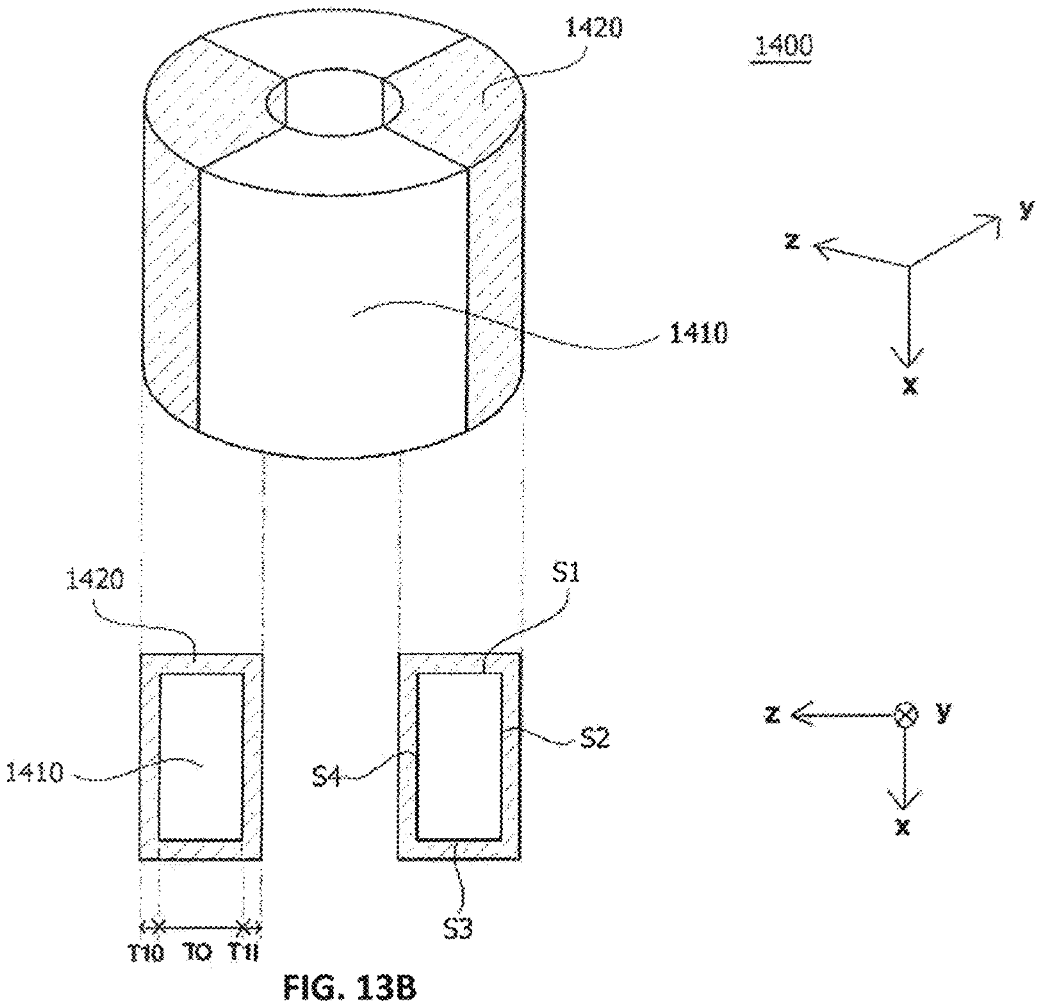
FIGS. 13A and 13B are, respectively, a coupled perspective view and a partial cross-sectional view of still another embodiment of the magnetic core shown in FIG. 2.

FIGS. 13A and 13B are, respectively, a coupled perspective view and a partial cross-sectional view of still another embodiment 1400 of the magnetic core 110 shown in FIG. 2.

Referring to FIGS. 13A and 13B, the magnetic core 1400 may include a first magnetic body 1410 and a second magnetic body 1420.

The first magnetic body 1410 and the second magnetic body 1420 may differ in magnetic permeability. The second magnetic body 1420 may have a higher saturation magnetic flux density than the first magnetic body 1410.

For example, the first magnetic body 1410 may include ferrite, and the second magnetic body 1420 may include a metal ribbon. Here, the relative permeability μs of the ferrite may range from 2,000 H/m to 15,000 H/m, and the relative permeability μs of the metal ribbon may range from 100,000 H/m to 150,000 H/m. For example, the ferrite may be Mn—Zn-based ferrite, and the metal ribbon may be a Fe-based nanocrystalline metal ribbon. The Fe-based nanocrystalline metal ribbon may be a nanocrystalline metal ribbon including Fe and Si.

The first magnetic body 1410 may have a toroidal shape, and the second magnetic body 1420 may be disposed on a region in the surface of the first magnetic body 1410, around which the coil 120 is wound. For example, in the case in which the coil 120 includes a first coil 122 wound around the magnetic core 1400 and a second coil 124 wound so as to be opposite the first coil 122, the second magnetic body 1420 may be disposed so as to cover the top surface S1, the outer circumferential surface S2, the bottom surface S3 and the inner circumferential surface S4 of the first magnetic body 1410 in each of the regions around which the first coil 122 and the second coil 124 are wound.

The thickness of the second magnetic body 1420 may be less than the thickness of the first magnetic body 1410 in at least one of the z-axis direction or the x-axis direction. The magnetic permeability of the magnetic core 1400 may be adjusted by adjusting a ratio of the thickness of the second magnetic body 1420 to the thickness of the first magnetic body 1410. To this end, the second magnetic body 1420 may include a metal ribbon stacked in multiple layers.

For example, in FIGS. 13A and 13B, the second magnetic body 1420, which is disposed on the outer circumferential surface S2 and the inner circumferential surface S4, may be wound in the range from 5 turns to 25 turns, preferably from 10 turns to 20 turns. Alternatively, the second magnetic body 1420 may be disposed so as to be stacked in a number within the range from 5 layers to 25 layers, preferably from 10 layers to 20 layers.

Further, the thickness ratio (T1O:TO) between the second magnetic body 1420 disposed on the outer circumferential surface S2 and the first magnetic body 1410 in the diameter direction (e.g., the y-axis direction or the z-axis direction) of the first magnetic body 1410 may range from 1:80 to 1:16, for example, from 1:40 to 1:20. However, the disclosure is not limited thereto. In this case, the second magnetic body 1420 disposed on the outer circumferential surface S2 may be wound in the range from 5 turns to 25 turns, preferably from 10 turns to 20 turns. Alternatively, the second magnetic body 1420 disposed on the outer circumferential surface S2 may be stacked in a number within the range from 5 layers to 25 layers, preferably from 10 layers to 20 layers.

Still further, the thickness ratio (T1I:TO) between the second magnetic body 1420 disposed on the inner circumferential surface S4 and the first magnetic body 1410 in the diameter direction (e.g., the y-axis direction or the z-axis direction) of the first magnetic body 1410 may range from 1:80 to 1:16, for example, from 1:40 to 1:20. However, the disclosure is not limited thereto. In this case, the second magnetic body 1420 disposed on the inner circumferential surface S4 may be wound in the range from 5 turns to 25 turns, preferably from 10 turns to 20 turns. Alternatively, the second magnetic body 1420 disposed on the outer circumferential surface S2 may be stacked in a number within the range from 5 layers to 25 layers, preferably from 10 layers to 20 layers.

With the above-described configuration, in which the second magnetic body 420, 820 and 1420, which is different from the first magnetic body 410, 810 and 1410, is disposed on at least a portion of the surface of the first magnetic body 410, 810 and 1410, it is possible to improve the noise removal performance of the magnetic core 400A, 400B, 800A to 800E and 1400.

Figure 14:
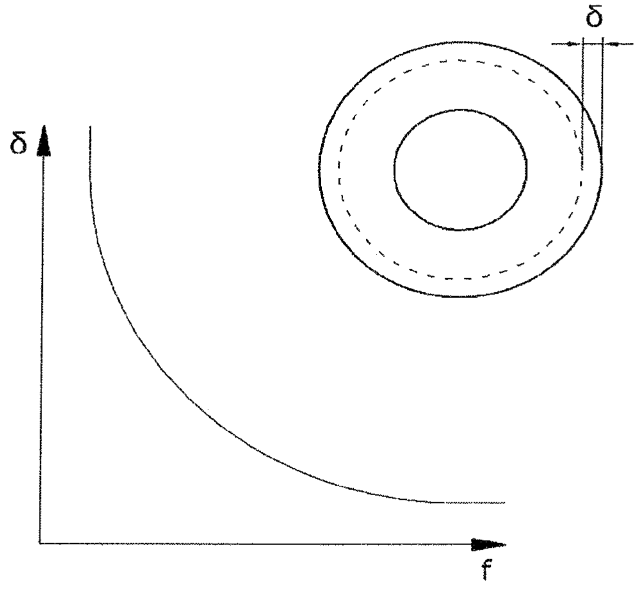
FIG. 14 is a graph showing a skin effect theory.

FIG. 14 is a graph showing a skin effect theory, wherein the horizontal axis represents a frequency f and the vertical axis represents a depth δ of the skin.

Figure 15:
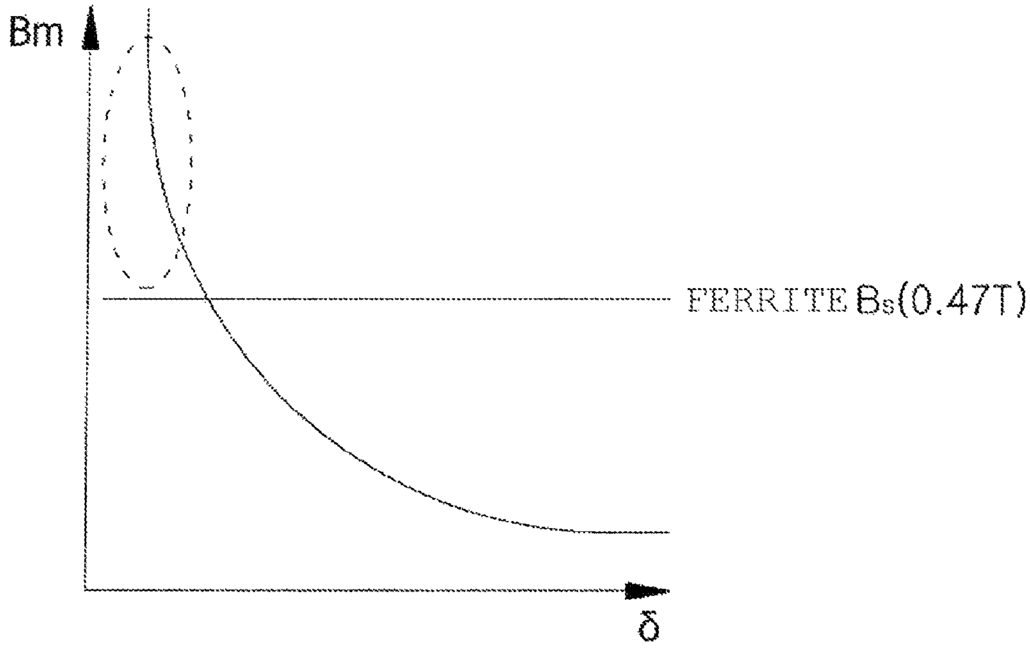
FIG. 15 is a graph showing a magnetic flux depending on a depth of the skin of a ferrite material.
Figure 16:
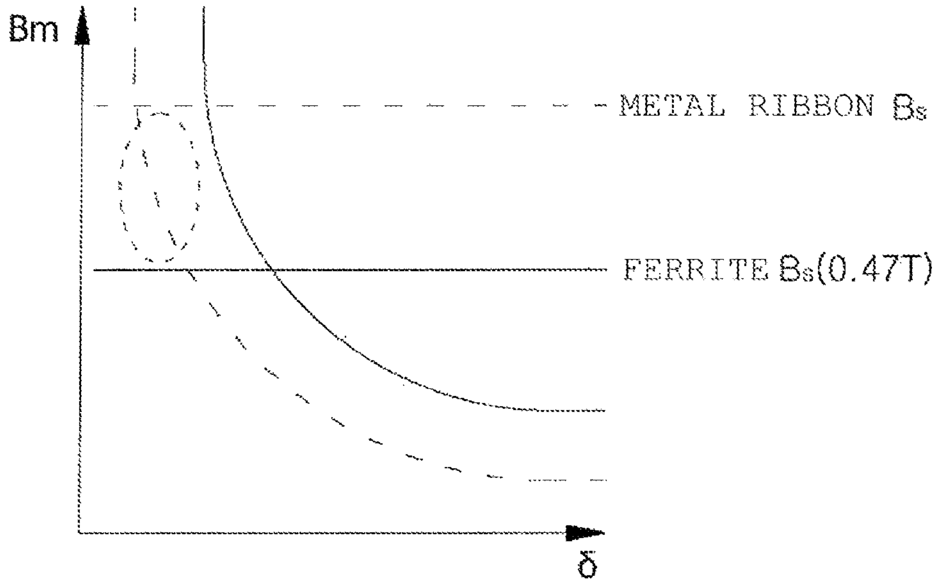
FIG. 16 is a graph showing a magnetic flux depending on a depth of the skin of a ferrite material and a metal ribbon material.

FIG. 15 is a graph showing a magnetic flux depending on a depth δ of the skin of a ferrite material, and FIG. 16 is a graph showing a magnetic flux depending on a depth δ of the skin of a ferrite material and a metal ribbon material. In each graph, the horizontal axis represents a depth δ of the skin, and the vertical axis represents magnetic flux Bm.

Figure 17A:
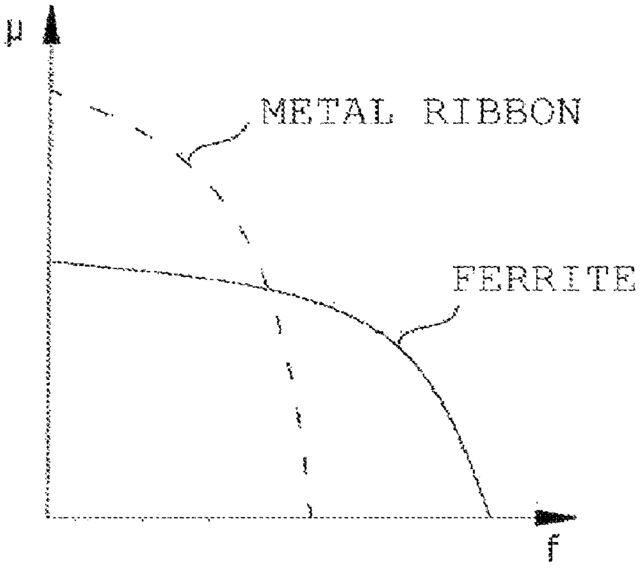
FIGS. 17A and 17B are graphs showing magnetic permeability and inductance of a ferrite material and a metal ribbon material.
Figure 17B:
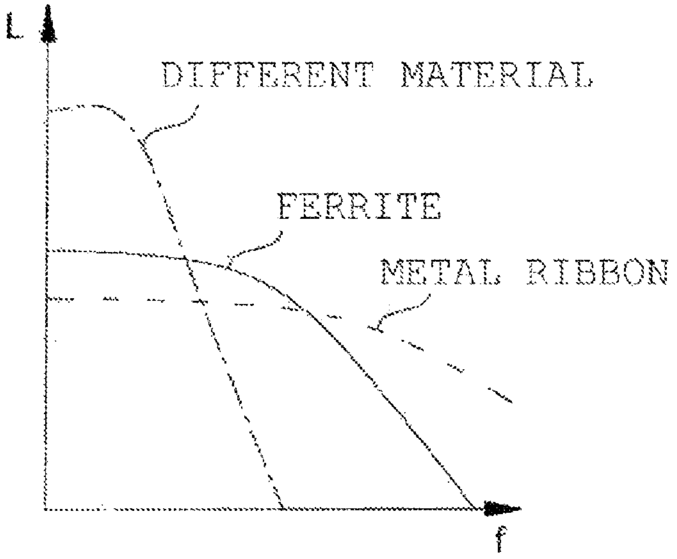

FIGS. 17A and 17B are graphs showing magnetic permeability p and inductance L of a ferrite material and a metal ribbon material. In each graph, the horizontal axis represents a frequency f. The vertical axis in the graph shown in FIG. 17(*a*) represents magnetic permeability p, and the vertical axis in the graph shown in FIG. 17(*b*) represents inductance L.

Referring to FIG. 14 and the following Equation 2, as the relative permeability μs of a material is higher and as the frequency f is higher, the value of the depth δ of the skin is reduced, and the magnetic flux Bm is therefore concentrated on the surface of a material.

$$\delta \propto \frac{p}{\mu_s \cdot f} \qquad \text{[Equation 2]}$$

Referring to FIG. 15, as the depth δ of the skin is smaller, a higher magnetic flux Bm is applied. Because the saturation magnetic flux density of a ferrite material is 0.47T, in the case in which the magnetic core includes only the first magnetic body 410, 810 and 1410, which is a ferrite core, if the magnetic flux Bm is greater than 0.47T, the magnetic core is saturated, which may deteriorate the noise removal performance.

Referring to FIG. 16, in the case in which a material, e.g. a metal ribbon material, which has a higher saturation magnetic flux density than a ferrite material, is used as the second magnetic body 420, 820 and 1420 and is disposed on the surface of the first magnetic body 410, 810 and 1410, which is a ferrite material, the magnetic core is capable of enduring a high magnetic flux Bm at a small depth δ of the skin, whereby the noise removal performance is maintained. With the configuration in which the second magnetic body 420, 820 and 1420, which has a higher saturation magnetic flux density than the first magnetic body 410, 810 and 1410, is disposed on at least a portion of the surface of the first magnetic body 410, 810 and 1410, it is possible to increase the effective cross-sectional area of the magnetic core 400A, 400B, 800A to 800E and 1400 at a high frequency.

Referring to FIGS. 17A and 17B, the magnetic core 400A, 400B, 800A to 800E and 1400, which includes the first magnetic body 410, 810 and 1410 formed of a ferrite material and the second magnetic body 420, 820 and 1420 formed of a metal ribbon material, which have different values of magnetic permeability for respective frequencies f, exhibits high inductance in a predetermined frequency range and therefore achieves high noise removal performance.

Hereinafter, the magnetic cores according to a comparative example and embodiments will be compared and described below with reference to the accompanying drawings.

Figure 18:
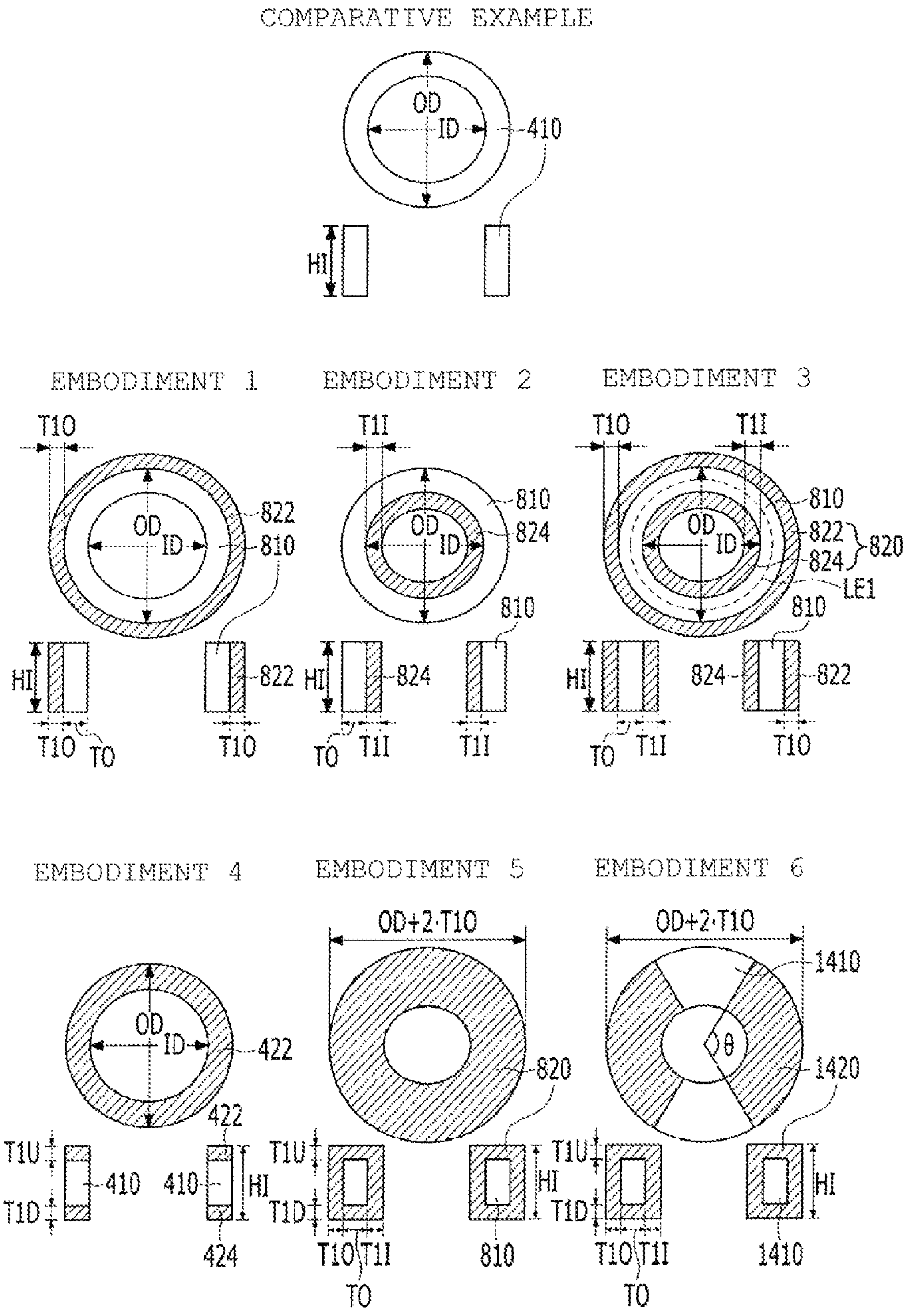
FIG. 18 illustrates top views and cross-sectional views of a comparative example and Embodiments 1 to 6 of the magnetic core.

FIG. 18 illustrates top views and cross-sectional views of the comparative example and Embodiments 1 to 6 of the magnetic core.

In FIG. 18, the comparative example has a configuration in which the magnetic core includes the first magnetic body 410 but does not include the second magnetic body 420, 820 and 1420. Embodiment 1, for example, as illustrated in FIG. 10, has a configuration in which the second magnetic body 822 includes only the outer magnetic body 822, which is disposed on the outer circumferential surface of the first magnetic body 810. Embodiment 2, for example, as illustrated in FIG. 11, has a configuration in which the second magnetic body 824 includes only the inner magnetic body 824, which is disposed on the inner circumferential surface of the first magnetic body 810. Embodiment 3, for example, as illustrated in FIG. 7, has a configuration in which the second magnetic body 820 includes the outer magnetic body 822 and the inner magnetic body 824, which are respectively disposed on the outer circumferential surface and the inner circumferential surface of the first magnetic body 810. Embodiment 4, for example, as illustrated in FIG. 5, has a configuration in which the second magnetic body includes the upper magnetic body 422 and the lower magnetic body 424, which are respectively disposed on the top surface and the bottom surface of the first magnetic body 410. Embodiment 5, for example, as illustrated in FIG. 12, has a configuration in which the second magnetic body 820 is disposed so as to cover the outer circumferential surface, the inner circumferential surface, the top surface and the bottom surface of the first magnetic body 810. Embodiment 6, for example, as illustrated in FIG. 13, has a configuration in which the second magnetic body 1420 is disposed on a region of the first magnetic body 1410, around which the coil 120 is wound.

Figure 19:
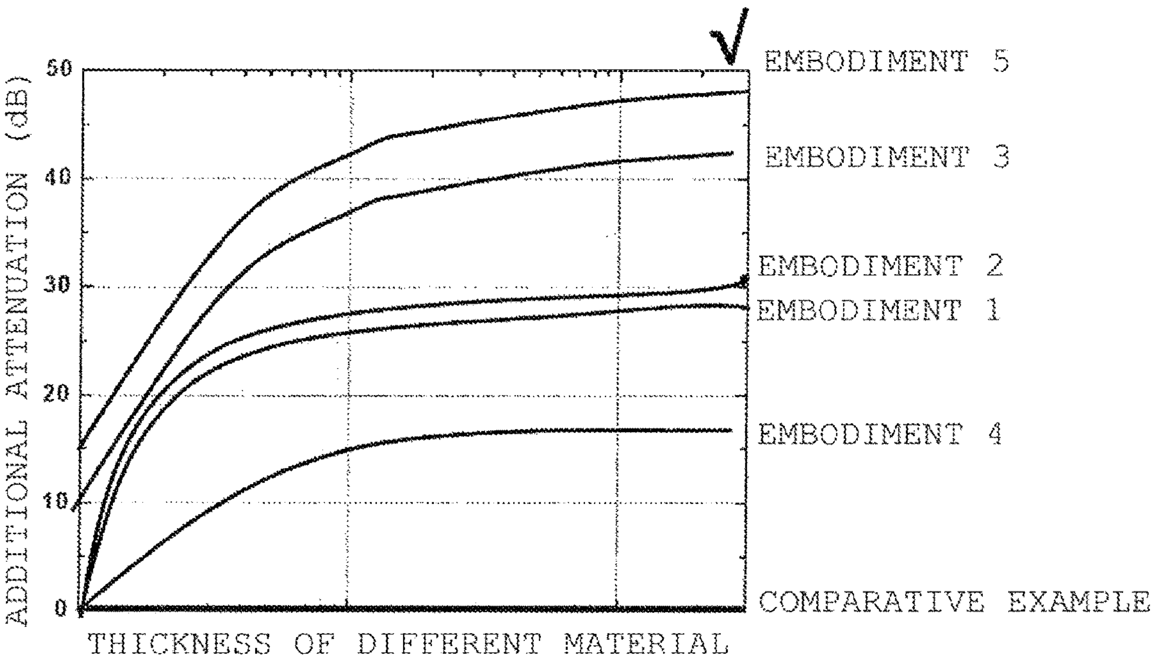
FIG. 19 is a graph showing the noise removal performance of the comparative example and Embodiments 1 to 6.

FIG. 19 is a graph showing the noise removal performance of the comparative example and Embodiments 1 to 5, wherein the horizontal axis represents a thickness of a different material, which is a thickness of the second magnetic body 420, 820 and 1420, which is different from the first magnetic body 410, 810 and 1410, i.e. a thickness from the center of the magnetic core in the y-axis or z-axis direction, and the vertical axis represents additional attenuation.

Figure 20A:
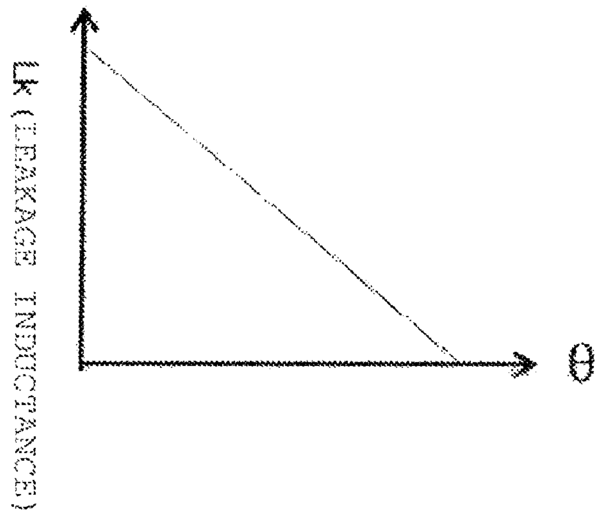
FIGS. 20A and 20B show leakage inductance and inductance for each 8 in Embodiment 6, respectively.
Figure 20B:
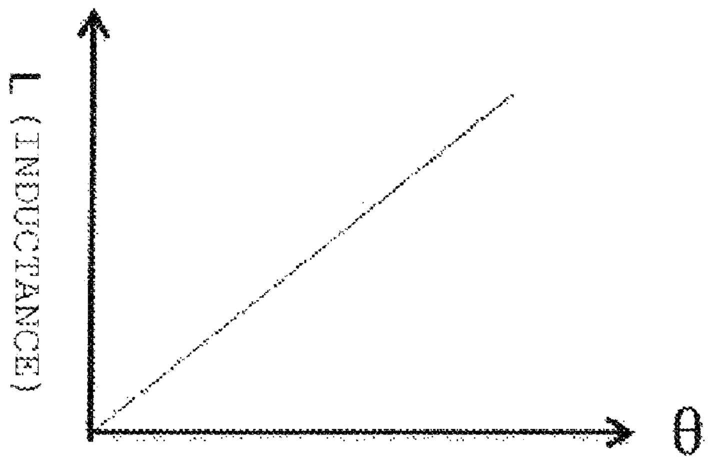
Figure 21:
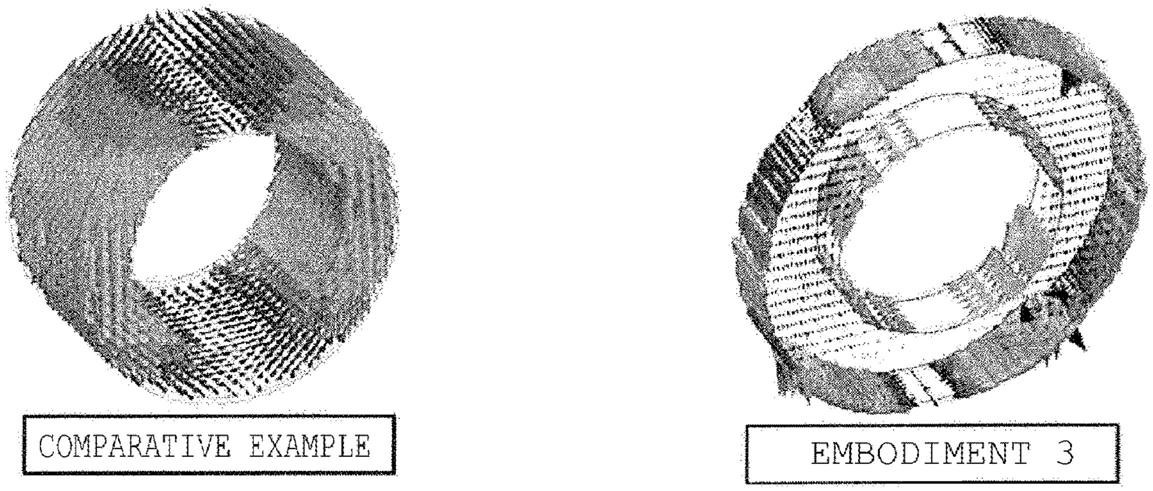
FIG. 21 shows the noise reduction effect in a differential mode of the comparative example and Embodiment 3 shown in FIG. 18.
Figure 22:
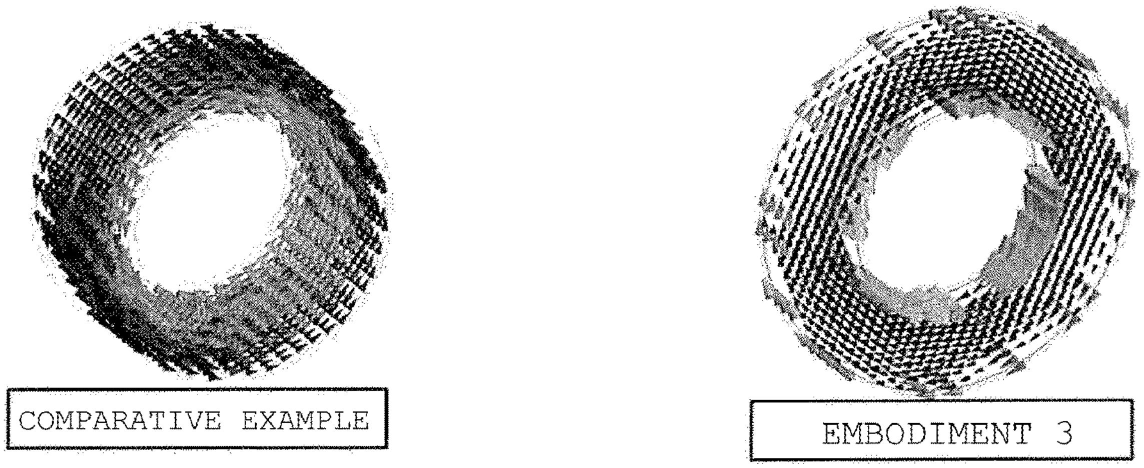
FIG. 22 shows the noise reduction effect in a common mode of the comparative example and Embodiment 3 shown in FIG. 18.

FIGS. 20A and 20B show leakage inductance Lk and inductance L for each 8 in Embodiment 6, respectively, FIG. 21 shows the noise reduction effect in a differential mode of the comparative example and Embodiment 3 shown in FIG. 18, and FIG. 22 shows the noise reduction effect in a common mode of the comparative example and Embodiment 3 shown in FIG. 18.

Referring to FIG. 18, in the comparative example and Embodiments 1 to 6, the first magnetic body 410, 810 and 1410 has an inner diameter ID of 16 mm, an outer diameter OD of 24 mm, and a height HI of 15 mm, and a toroidal-shaped Mn—Zn-based ferrite core is used as the first magnetic body. Further, in Embodiments 1 to 6, a Fe—Si-based metal ribbon is used as the second magnetic body 422, 820 and 1420 in such a manner that a metal ribbon having a thickness of 20 μm±1 μm is wound or stacked. The metal ribbon may be wound in the range from 5 turns to 25 turns, preferably from 10 turns to 20 turns, or may be stacked in a number within the range from 5 layers to 25 layers, preferably from 10 layers to 20 layers.

The noise removal performance of the comparative example and Embodiments 1 to 5 was simulated under the conditions of 21 windings of a coil around the magnetic core and the application of current of 1 A (ampere) and power of 220 W. Referring to FIG. 19, it is confirmed that Embodiment 5, in which the second magnetic body 820 is disposed on the entire surface of the first magnetic body 810, achieves the highest noise removal performance and that the larger the area occupied by the second magnetic body, the higher the noise removal performance.

Comparing Embodiments 1 to 3, Embodiment 1 is configured such that the second magnetic body 822 is disposed only outside the first magnetic body 810, Embodiment 2 is configured such that the second magnetic body 824 is disposed only inside the first magnetic body 810, and Embodiment 3 is configured such that the second magnetic body 820 (822 and 824) is disposed inside and outside the first magnetic body 810. It is confirmed that the degree of attenuation of Embodiment 3 is improved by about 30% compared to that of Embodiments 1 and 2. Further, Embodiments 1 and 3 are capable of achieving improved noise removal performance with the same thickness in the diameter direction (e.g., the y-axis direction or the z-axis direction). That is, it is possible to achieve improved noise removal performance with the same size.

Still further, referring to FIG. 18, showing Embodiment 6, and FIG. 20, as the value of θ decreases, the exposed area of the first magnetic body increases, whereby the leakage inductance Lk increases and the inductance decreases. On the other hand, as the value of θ increases, the exposed area of the first magnetic body decreases, whereby the leakage inductance Lk decreases and the inductance L increases, leading to an improvement in noise removal performance.

FIGS. 21 and 22 are views respectively showing the noise removal performance in a differential mode and the noise removal performance in a common mode, obtained by connecting the comparative example and Embodiment 3 of the magnetic core to a power board and measuring a magnetic field.

Referring to FIG. 21, compared to the comparative example, a degree of internal saturation of Embodiment 3 of the magnetic core decreases. Therefore, it is confirmed that the magnetic core according to the embodiment of the disclosure is suitable for high-power products.

Referring to FIG. 22, as the frequency becomes higher, the area efficiency of the comparative example is lowered due to the saturation of the surface of the magnetic core, whereas Embodiment 3 of the magnetic core has an improved area efficiency because the surface of the magnetic core is not saturated due to the second magnetic body 820 (822 and 824) disposed on the surface of the first magnetic body 810, and consequently has an improved noise removal effect at a high frequency.

Hereinafter, the characteristics of inductors including the comparative example and Embodiment 3 of the magnetic core, which are shown in FIG. 18, will be compared and described below with reference to the accompanying drawings. Embodiment 3 of the magnetic core shown in FIG. 18 may have the configuration of the magnetic core 800A illustrated in FIGS. 7A and 7B. However, the disclosure is not limited thereto. The inductor, which will be described below, is capable of being applied to any inductor that includes a magnetic core having an outer magnetic body and an inner magnetic body.

First, the characteristics of the inductor according to the comparative example in a differential mode will be described below.

Figure 23:
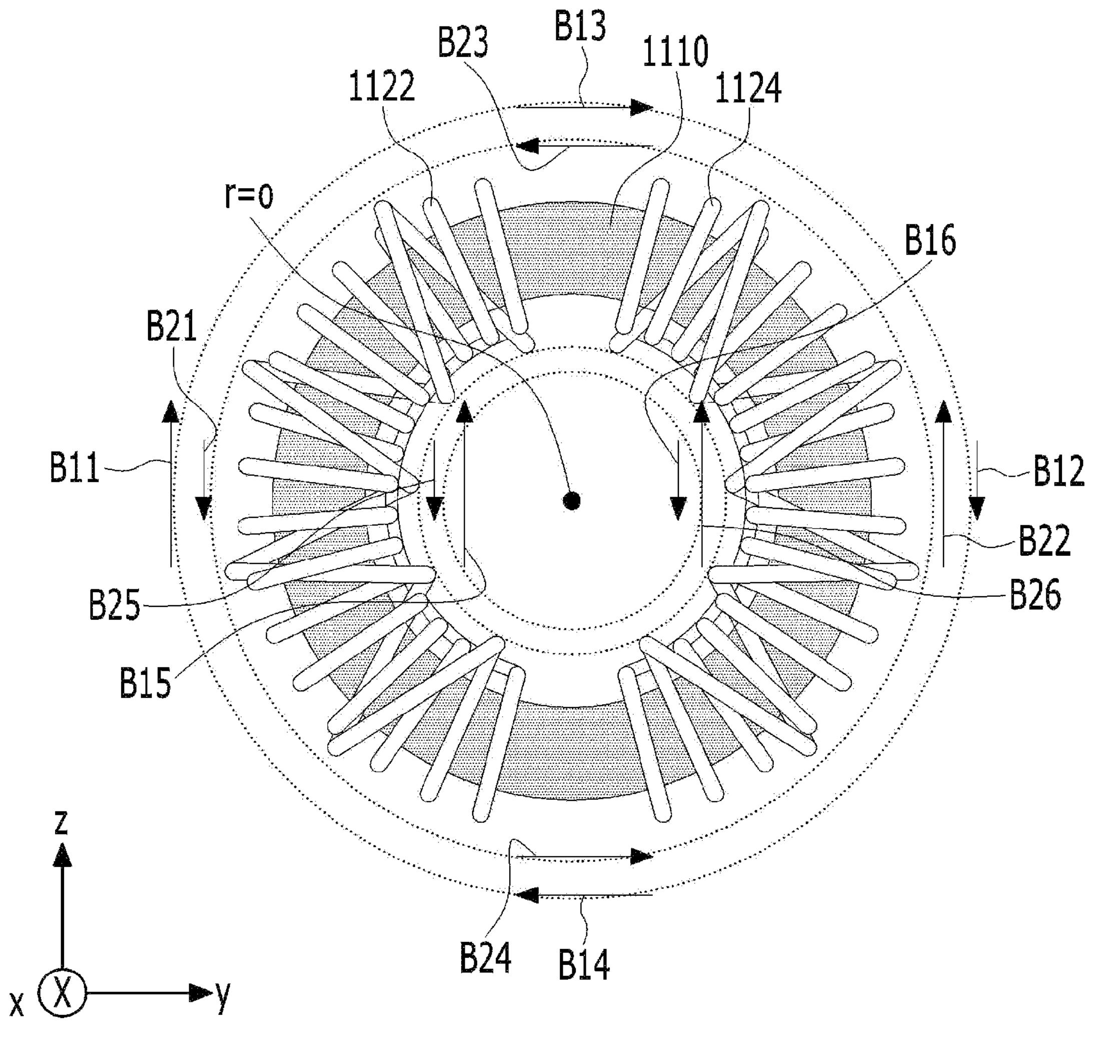
FIG. 23 is a view showing the magnetic-field characteristics of a general inductor in a differential mode.

FIG. 23 is a view showing the magnetic-field characteristics of a general inductor in a differential mode, wherein reference numerals B11 to B16 represent magnetic fields of a first coil 1122 and reference numerals B21 to B26 represent magnetic fields of a second coil 1124.

The inductor shown in FIG. 23 may include a magnetic core 1110 and first and second coils 1122 and 1124. In the case in which the inductor shown in FIG. 23 is the inductor according to the comparative example, the magnetic core 1110 includes only a first magnetic body. The first magnetic body of the magnetic core 1110, which is included in the inductor according to the comparative example, may correspond to the first magnetic body 410, 810 and 1410 shown in FIGS. 3 to 13. The first and second coils 1122 and 1124 shown in FIG. 23 are the same as the first and second coils 122 and 124 shown in FIG. 2, and a duplicate explanation thereof will therefore be omitted.

Referring to FIG. 23, most of the magnetic field that is induced in the inductor according to the comparative example by the current applied to the first and second coils 1122 and 1124 of the inductor from the outside (hereinafter referred to as "applied current") needs to be cancelled. The magnetic field B13 of the first coil 1122 and the magnetic field B23 of the second coil 1124 may have the same magnitude at an upper side of the inductor, and may therefore cancel each other out. Further, the magnetic field B14 of the first coil 1122 and the magnetic field B24 of the second coil 1124 may have the same magnitude at a lower side of the inductor, and may therefore cancel each other out. However, the magnetic field B11 of the first coil 1122 may have a larger magnitude than the magnetic field B21 of the second coil 1124 at a left side of the inductor, around which the first coil 1122 is wound, and the magnetic field B22 of the second coil 1124 may have a larger magnitude than the magnetic field B12 of the first coil 1122 at a right side of the inductor, around which the second coil 1124 is wound. As such, in the case of the inductor according to the comparative example, the magnetic fields are not actually cancelled out. Further, when high current is applied, the saturation area of the magnetic body by the magnetic fields increases, which may deteriorate performance. However, compared to the magnetic-field characteristics in a common mode to be described later, the inductor according to the comparative example may store relatively high energy due to the higher degree of cancellation of the magnetic fields.

Figure 24:
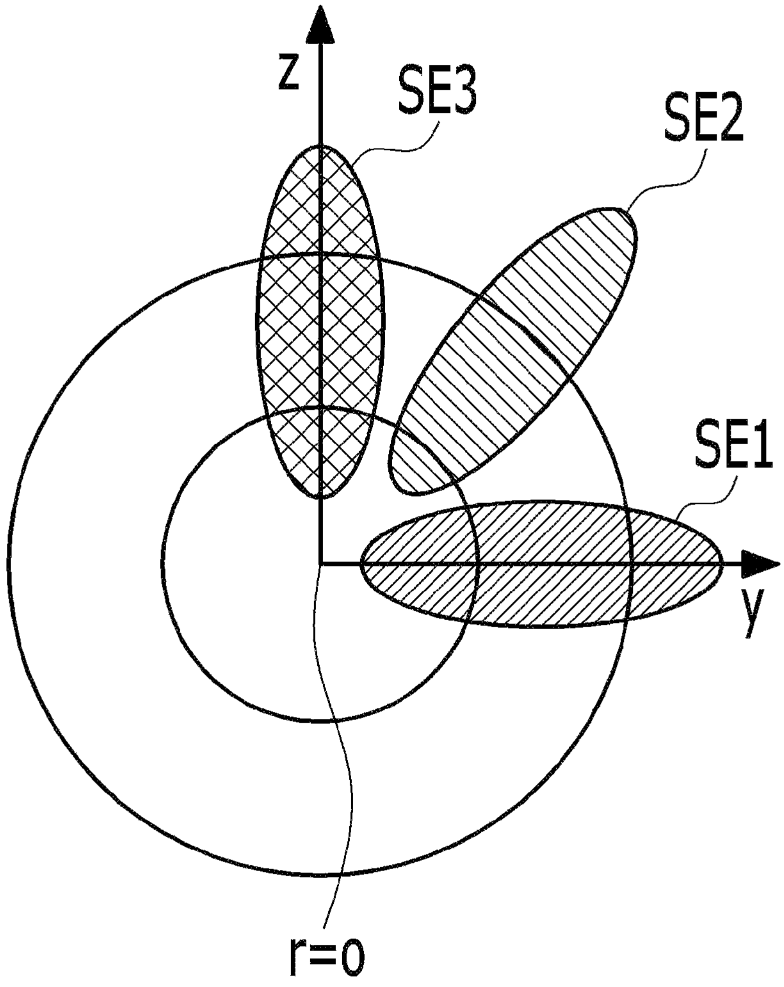
FIG. 24 shows the configuration of the inductor shown in FIG. 23, in which the inductor is divided into three sections.

FIG. 24 shows the configuration of the inductor shown in FIG. 23, in which the inductor is divided into three sections SE1, SE2 and SE3.

Figure 25A:
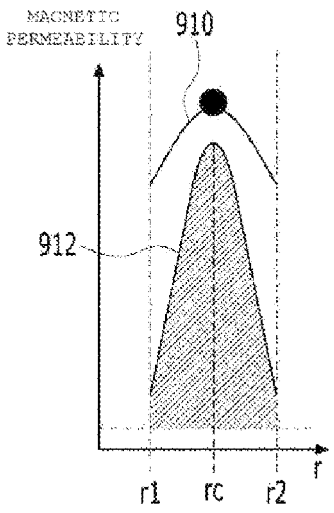
FIGS. 25A, 25B and 25 C show the magnetic permeability of first, second and third sections, respectively, at a certain time point in a differential mode of the inductor according to the comparative example.
Figure 25B:
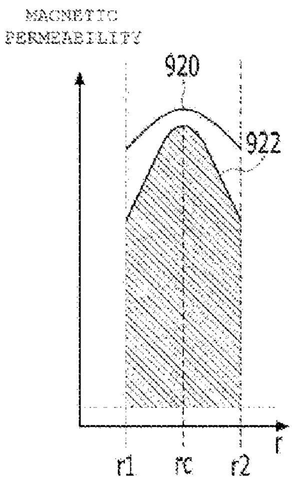
Figure 25C:
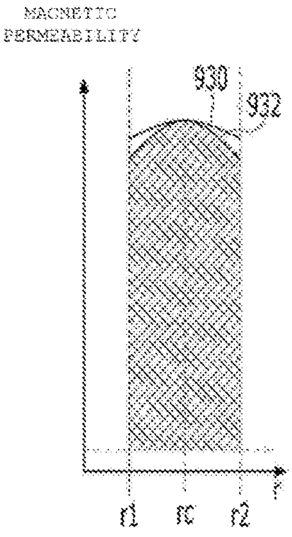

FIGS. 25A, 25B and 25C show the magnetic permeability (or relative permeability) of the first, second and third sections SE1, SE2 and SE3, respectively, at a certain time point in a differential mode of the inductor according to the comparative example. Here, the magnetic permeability may be expressed by the above Equation 1, and has a value obtained under the condition of relative permeability μs of 10,000 H/m.

In FIGS. 25A to 25C, reference numerals 910, 920 and 930 represent magnetic permeability in a mode in which low power is applied to the inductor (hereinafter referred to as a "low-power mode"), and reference numerals 912, 922 and 932 represent magnetic permeability in a mode in which high power is applied to the inductor (hereinafter referred to as a "high-power mode"). In FIGS. 25A to 5C, the horizontal axis represents a position in the radial (r) direction of the inductor. In FIGS. 23 and 24, "r=0" represents the center of the annular-shaped inductor.

Referring to FIGS. 25A to 25C, in any of the sections, the magnetic permeability of the first magnetic body of the magnetic core 1110 has a minimum value at the inner edge r1 and the outer edge r2 of the magnetic core 1110 and has a maximum value at the center rc of the magnetic core 1110. This phenomenon occurs identically both in the high-power mode 912, 922 and 932 and in the low-power mode 910, 920 and 930.

Figure 26:
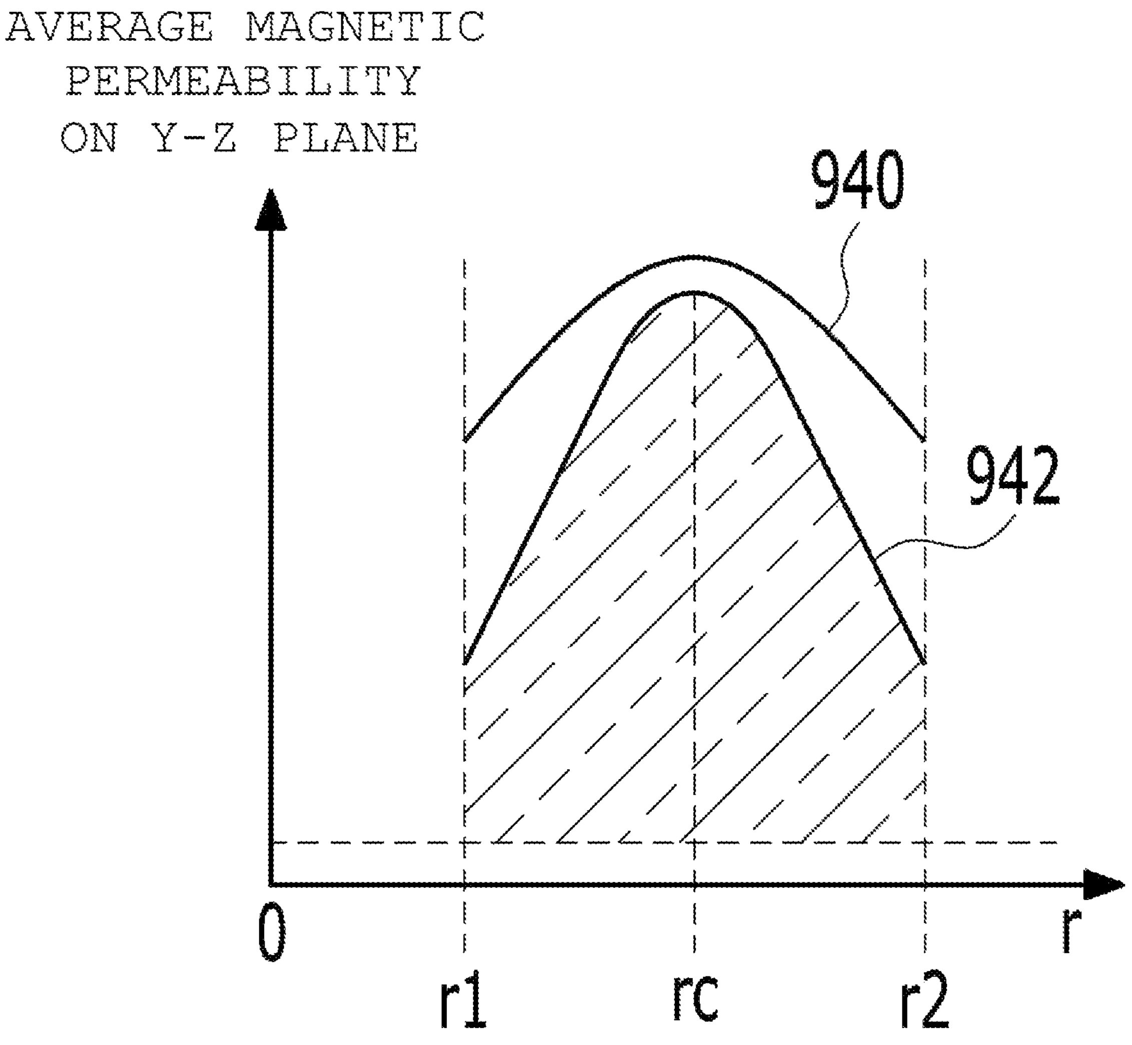
FIG. 26 is a graph showing an average magnetic permeability on the y-z plane in a differential mode of the inductor according to the comparative example.

FIG. 26 is a graph showing an average magnetic permeability on the y-z plane in a differential mode of the inductor according to the comparative example, wherein the horizontal axis represents a position in the radial (r) direction of the inductor and the vertical axis represents an average magnetic permeability on the y-z plane. In FIG. 26, reference numeral 940 represents an average magnetic permeability in a low-power mode, and reference numeral 942 represents an average magnetic permeability in a high-power mode.

Figure 27:
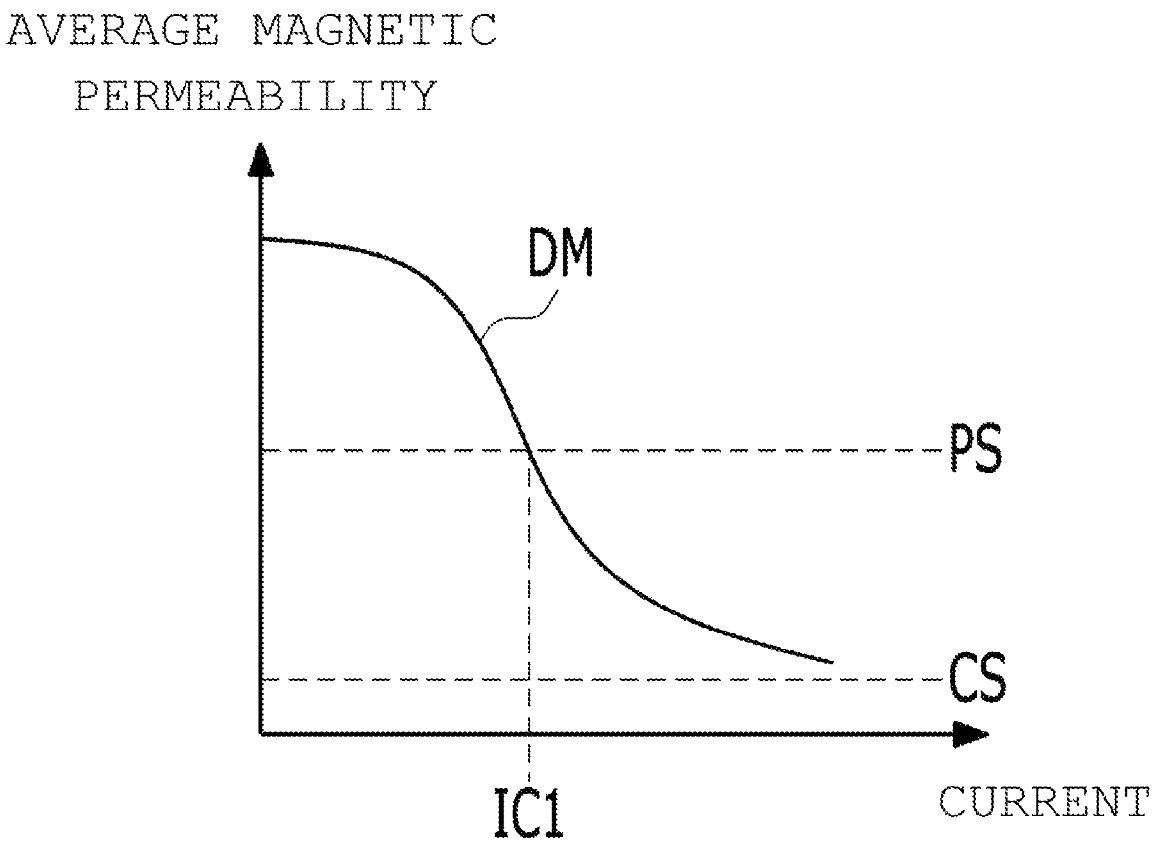
FIG. 27 is a graph showing an average magnetic permeability in a differential mode of the inductor according to the comparative example.

FIG. 27 is a graph showing an average magnetic permeability in a differential mode of the inductor according to the comparative example, wherein the horizontal axis represents current and the vertical axis represents an average magnetic permeability.

FIG. 26 shows a result obtained through line integration of the magnetic permeability, which is obtained at every time point, as illustrated in FIGS. 25A to 25C, in the circumferential direction of the inductor and structural average and time average of the line integration value when the frequency of the applied current (hereinafter referred to as an "applied frequency") is in the range from 40 Hz to 70 Hz. FIG. 27 shows a result obtained through volume integration of the result value shown in FIG. 26 and time average of the volume integration value.

Referring to FIG. 27, as the current increases in a differential mode, the average magnetic permeability of the inductor according to the comparative example decreases. When the applied current is IC1, the inductor according to the comparative example reaches a partially saturated PS state in which the inductor loses 50% of the function thereof, and as the current continuously increases, the inductor reaches a completely saturated CS state in which the inductor loses 100% of the function thereof.

Next, the characteristics of the inductor according to the comparative example in a common mode will be described below.

Figure 28:
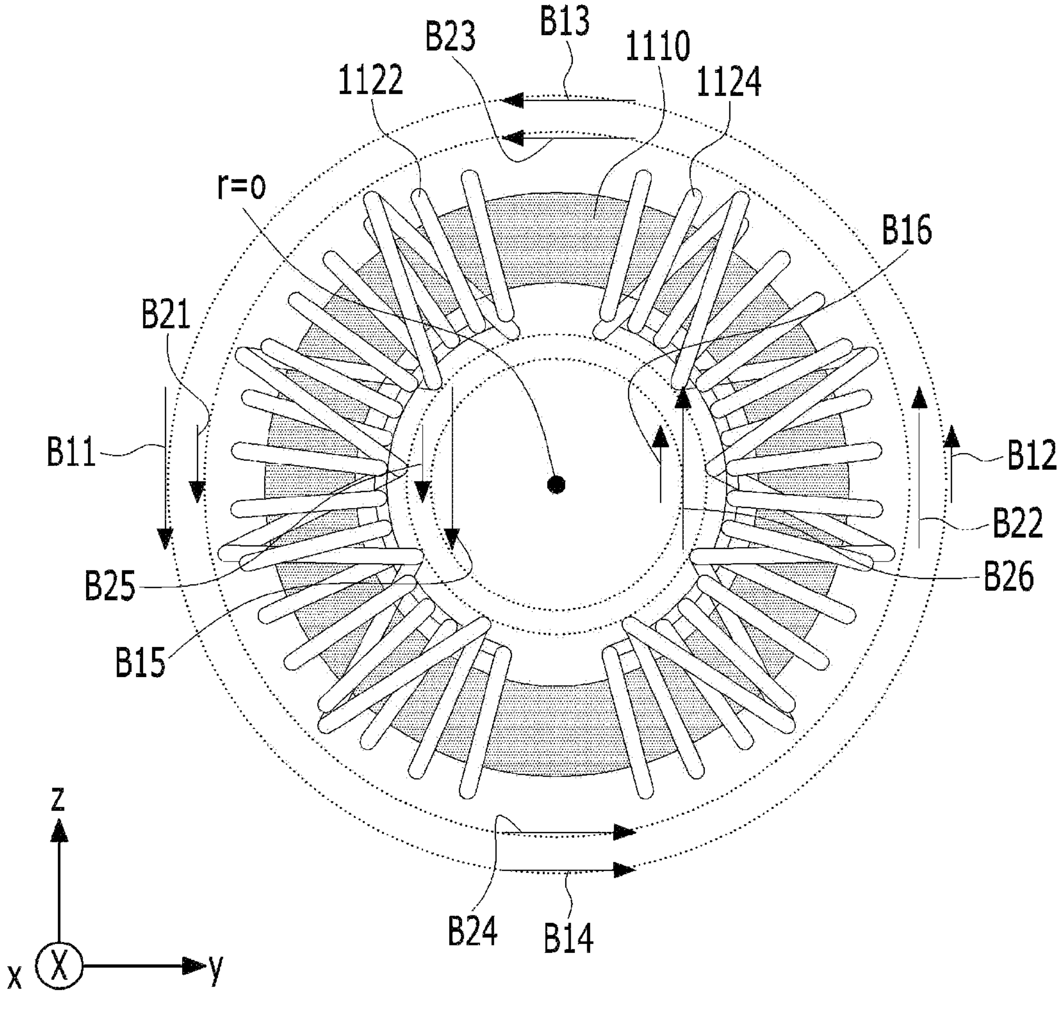
FIG. 28 is a view showing the magnetic-field characteristics of a general inductor in a common mode.

FIG. 28 is a view showing the magnetic-field characteristics of a general inductor in a common mode, wherein reference numerals B11 to B16 represent magnetic fields of a first coil 1122 and reference numerals B21 to B26 represent magnetic fields of a second coil 1124.

The inductor shown in FIG. 28 may include a magnetic core 1110 and first and second coils 1122 and 1124. In the inductor according to the comparative example shown in FIG. 28, the magnetic core 1110 includes only a first magnetic body. The first magnetic body of the magnetic core 1110, which is included in the inductor according to the comparative example, may correspond to the first magnetic body 410, 810 and 1410 shown in FIGS. 3 to 13. The first and second coils 1122 and 1124 shown in FIG. 28 are the same as the first and second coils 122 and 124 shown in FIG. 2, and a duplicate explanation thereof will therefore be omitted.

Referring to FIG. 28, the magnetic field B13 of the first coil 1122 and the magnetic field B23 of the second coil 1124 are added to each other at an upper side of the inductor, the magnetic field B14 of the first coil 1122 and the magnetic field B24 of the second coil 1124 are added to each other at a lower side of the inductor, the magnetic field B11 of the first coil 1122 is added to the magnetic field B21 of the second coil 1124 at a left side of the inductor, around which the first coil 1122 is wound, and the magnetic field B22 of the second coil 1124 is added to the magnetic field B12 of the first coil 1122 at a right side of the inductor, around which the second coil 1124 is wound. As such, the magnetic fields induced in the inductor by the applied current applied to the first and second coils 1122 and 1124 of the inductor according to the comparative example from the outside are not cancelled, but the magnetic fields are mostly added to each other, whereby the magnetic permeability may be easily saturated when noise is introduced (i.e. when reverse current is introduced). The function may be maintained when reflected current is equal to or less than 1/1000 of power consumption.

The inductor shown in FIG. 28, like the inductor shown in FIG. 24, may be divided into three sections SE1, SE2 and SE3.

Figure 29A:
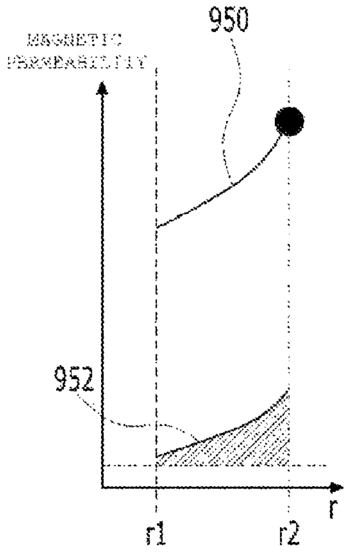
FIGS. 29A, 29B and 29C show the magnetic permeability of first, second and third sections, respectively, at a certain time point in a common mode of the inductor according to the comparative example.
Figure 29B:
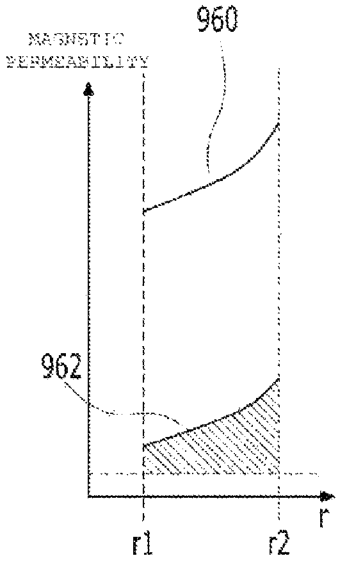
Figure 29C:
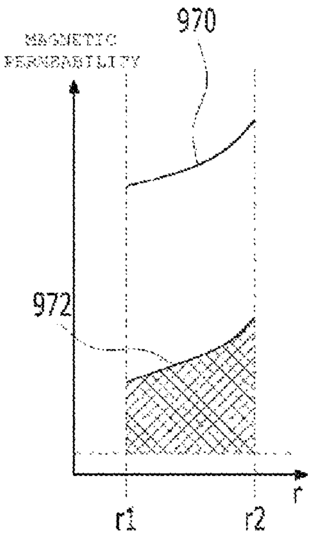

FIGS. 29A, 29B and 29C show the magnetic permeability (or relative permeability) of the first, second and third sections SE1, SE2 and SE3, respectively, at a certain time point in a common mode of the inductor according to the comparative example. Here, the magnetic permeability may be expressed by the above Equation 1, and has a value obtained under the condition of relative permeability μs of 10,000 H/m.

In FIGS. 29A to 29C, reference numerals 950, 960 and 970 represent magnetic permeability in a low-power mode, and reference numerals 952, 962 and 972 represent magnetic permeability in a high-power mode. In FIGS. 29A to 29C, the horizontal axis represents a position in the radial (r) direction of the inductor. In FIG. 28, "r=0" represents the center of the annular-shaped inductor.

Referring to FIGS. 29A to 29C, in each of the low-power mode 950, 960 and 970 and the high-power mode 952, 962 and 972, the magnetic permeability of the magnetic core 1110 gradually increases from the inner edge r1 of the magnetic core 1110 to the outer edge r2 thereof in any of the sections.

Figure 30:
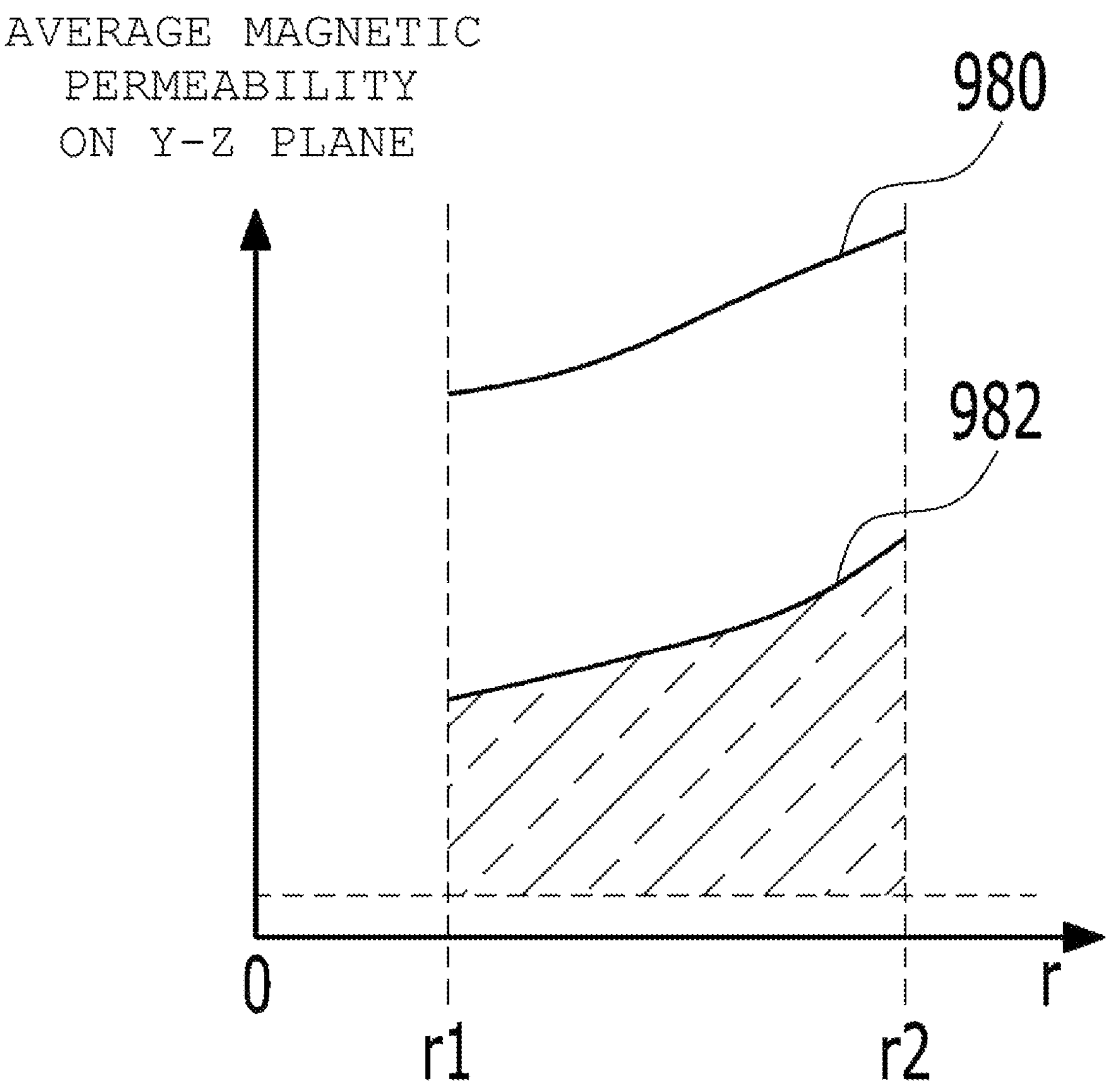
FIG. 30 is a graph showing an average magnetic permeability on the y-z plane in a common mode of the inductor according to the comparative example.

FIG. 30 is a graph showing an average magnetic permeability on the y-z plane in a common mode of the inductor according to the comparative example, wherein the horizontal axis represents a position in the radial (r) direction of the inductor and the vertical axis represents an average magnetic permeability on the y-z plane. In FIG. 30, reference numeral 980 represents an average magnetic permeability in a low-power mode, and reference numeral 982 represents an average magnetic permeability in a high-power mode.

Figure 31:
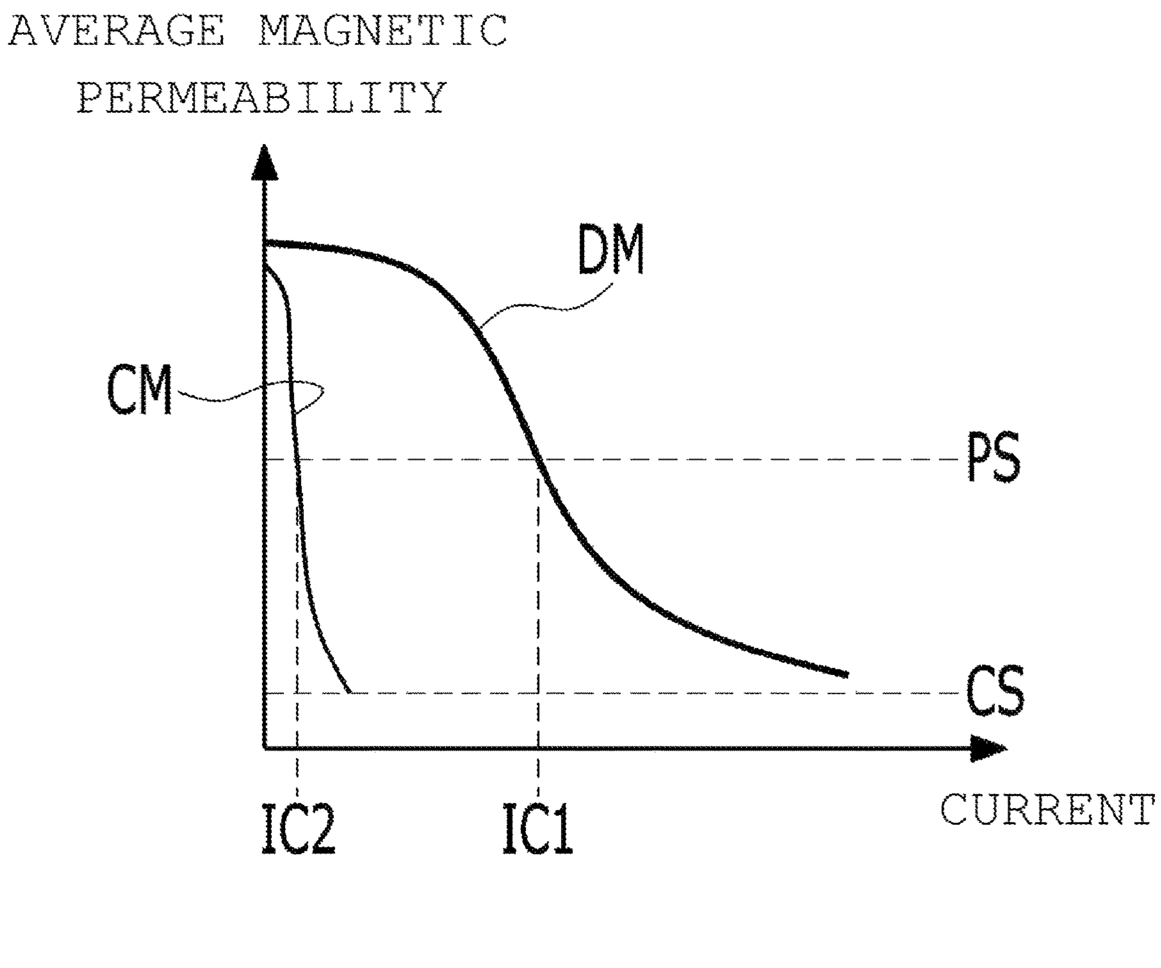
FIG. 31 is a graph showing an average magnetic permeability in a common mode of the inductor according to the comparative example.

FIG. 31 is a graph showing an average magnetic permeability in a common mode of the inductor according to the comparative example, wherein the horizontal axis represents current and the vertical axis represents an average magnetic permeability.

FIG. 30 shows a result obtained through line integration of the magnetic permeability, which is obtained at every time point, as illustrated in FIGS. 29A to 29C, in the circumferential direction of the inductor and structural average and time average of the line integration value. FIG. 31 shows a result obtained through volume integration of the result value shown in FIG. 30 and time average of the volume integration value.

Referring to FIG. 31, as the current increases in a common mode, the average magnetic permeability of the inductor according to the comparative example decreases. When the applied current is IC2, the inductor according to the comparative example reaches a partially saturated PS state in which the inductor loses 50% of the function thereof, and as the applied current continuously increases, the inductor reaches a completely saturated CS state in which the inductor loses 100% of the function thereof. Referring to FIG. 31, it is confirmed that the partial saturation is realized earlier at a lower current in the common mode CM than in the differential mode DM.

In the state in which the applied current to be used in the inductor according to the comparative example is applied in a differential manner (i.e. in the state in which the function of the magnetic body is lowered), when reverse current noise of a power factor correction circuit and reverse current noise due to switching for driving a transformer are introduced in the manner of a high-frequency (e.g. 1 kHz to 1 MHz) common mode and when high-frequency noise (e.g. 1 MHz to 30 MHz) due to other communication circuits is introduced, the noise reduction function may be lowered. The function of the inductor according to the comparative example may be greatly lowered when reverse current is introduced due to impedance mismatch between an EMI filter to be described later and the power factor correction circuit.

Next, the characteristics of Embodiment 3 of the inductor in a differential mode will be described below.

Embodiment 3 of the inductor, as shown in FIGS. 23 to 28, includes first and second coils 1122 and 1124 and a magnetic core 1110. The magnetic core 1110, as illustrated in FIG. 7, may include a first magnetic body 810 and a second magnetic body 820, and the second magnetic body 820 may include an outer magnetic body 822 and an inner magnetic body 824.

Like the inductor according to the comparative example, Embodiment 3 of the inductor, as shown in FIG. 24, may be divided into three sections.

Figure 32A:
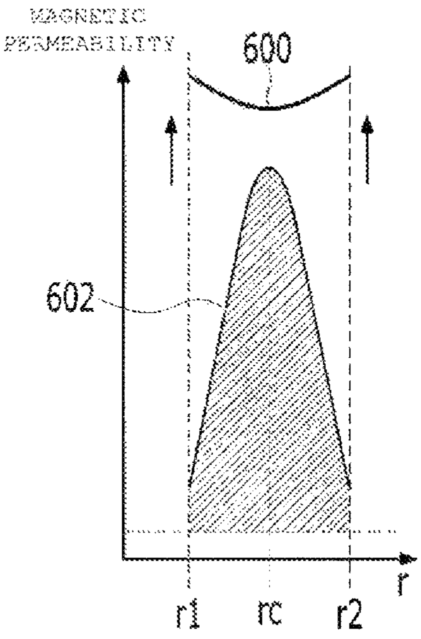
FIGS. 32A, 32B and 32C show the magnetic permeability of first, second and third sections, respectively, at a certain time point in a differential mode of Embodiment 3 of the inductor.
Figure 32B:
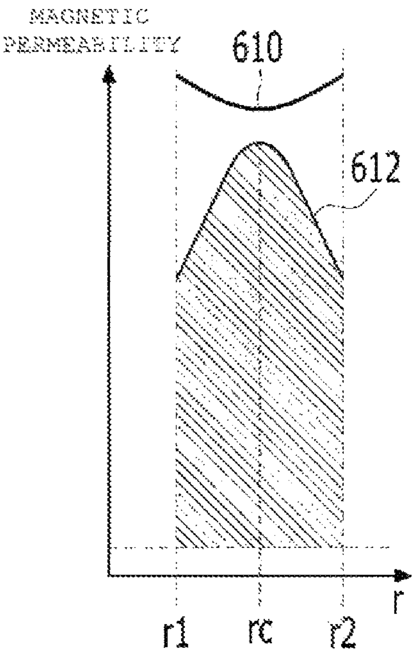
Figure 32C:
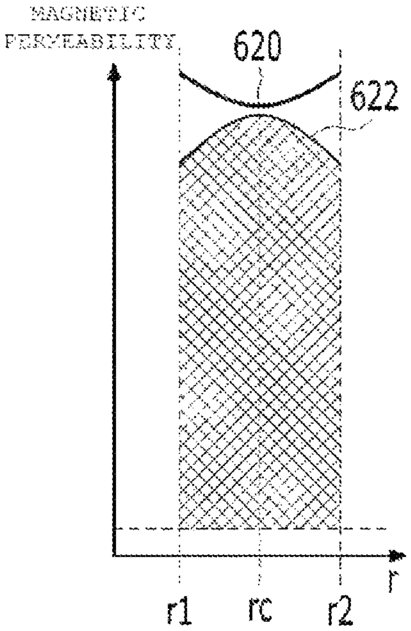

FIGS. 32A, 32B and 32C show the magnetic permeability (or relative permeability) of the first, second and third sections SE1, SE2 and SE3, respectively, at a certain time point in a differential mode of Embodiment 3 of the inductor. Here, the magnetic permeability may be expressed by the above Equation 1.

In FIGS. 32A to 32C, reference numerals 600, 610 and 620 represent magnetic permeability in a low-power mode, and reference numerals 602, 612 and 622 represent magnetic permeability in a high-power mode. In FIGS. 32A to 32C, the horizontal axis represents a position in the radial (r) direction of the inductor.

Referring to FIGS. 32A to 32C, when the applied frequency of the current applied to the first and second coils 1122 and 1124 is less than a critical frequency, in any of the sections in a low-power mode, the relative permeability (hereinafter referred to as a "first relative permeability") of the first magnetic body 810, which is located at the center rc of a magnetic sheet, is less than the relative permeability (hereinafter referred to as a "second relative permeability") of the outer magnetic body 822, which is located at the outer portion r2 of the magnetic sheet, and is less than the relative permeability (hereinafter referred to as a "third relative permeability") of the inner magnetic body 824, which is located at the inner portion r1 of the magnetic sheet. Alternatively, the relative permeability of the magnetic bodies, which are located at the inner portion r1, the outer portion r2 and the center rc of the magnetic sheet, may be constant.

On the other hand, when the frequency of the current applied to the first and second coils 1122 and 1124 is equal to or greater than the critical frequency, unlike the phenomenon shown in FIGS. 32A to 32C, each of the second relative permeability and the third relative permeability becomes less than the first relative permeability in any of the sections in a low-power mode. In Embodiment 3 of the inductor, the magnetic permeability 602, 612 and 622 in a high-power mode may be contrary to the magnetic permeability 600, 610 and 620 in a low-power mode.

Here, the critical frequency is a frequency at which the magnetic permeability is reversed due to a reduction in the second and third relative permeability of the second magnetic body 820 (i.e. a reduction in the induction amount due to loss of eddy current), which is embodied as a nanoribbon, at a high frequency.

The above-described critical frequency may increase as the thickness T1O and T1I of each of the outer and inner magnetic bodies 822 and 824 decreases. This is because a reduction in the induction amount due to loss of eddy current decreases as the thickness T1O and T1I of the second magnetic body 820, which is embodied as a nanoribbon, decreases.

For example, the thickness T1O and T1I of each of the outer and inner magnetic bodies 822 and 824 is in the range from 200 μm±10 μm (20 μm±1 μm and 10 turns) to 400 μm±10 μm (40 μm±1 μm and 10 turns), the critical frequency may range from 150 kHz to 250 kHz. For example, when the thickness T1O and T1I of each of the outer and inner magnetic bodies 822 and 824 is 400 μm±10 μm and when the number n of turns of each of the first and second coils 1122 and 1124 is 10, the critical frequency is 150 kHz. When the thickness T1O and T1I of each of the outer and inner magnetic bodies 822 and 824 is 200 μm±10 μm and when the number n of turns of each of the first and second coils 1122 and 1124 is 10, the critical frequency may increase to 200 kHz to 250 kHz, for example, 200 kHz.

The inductance LDM of Embodiment 3 of the inductor in a differential mode may be expressed by the following Equation 3.

$$L_{DM} = L_{CM} - \frac{M^2}{L_{CM}} \quad \text{[Equation 3]}$$

Here, LCM represents inductance of Embodiment 3 of the inductor in a common mode and is expressed by the following Equation 4, and M represents a mutual inductance.

Figure 33:
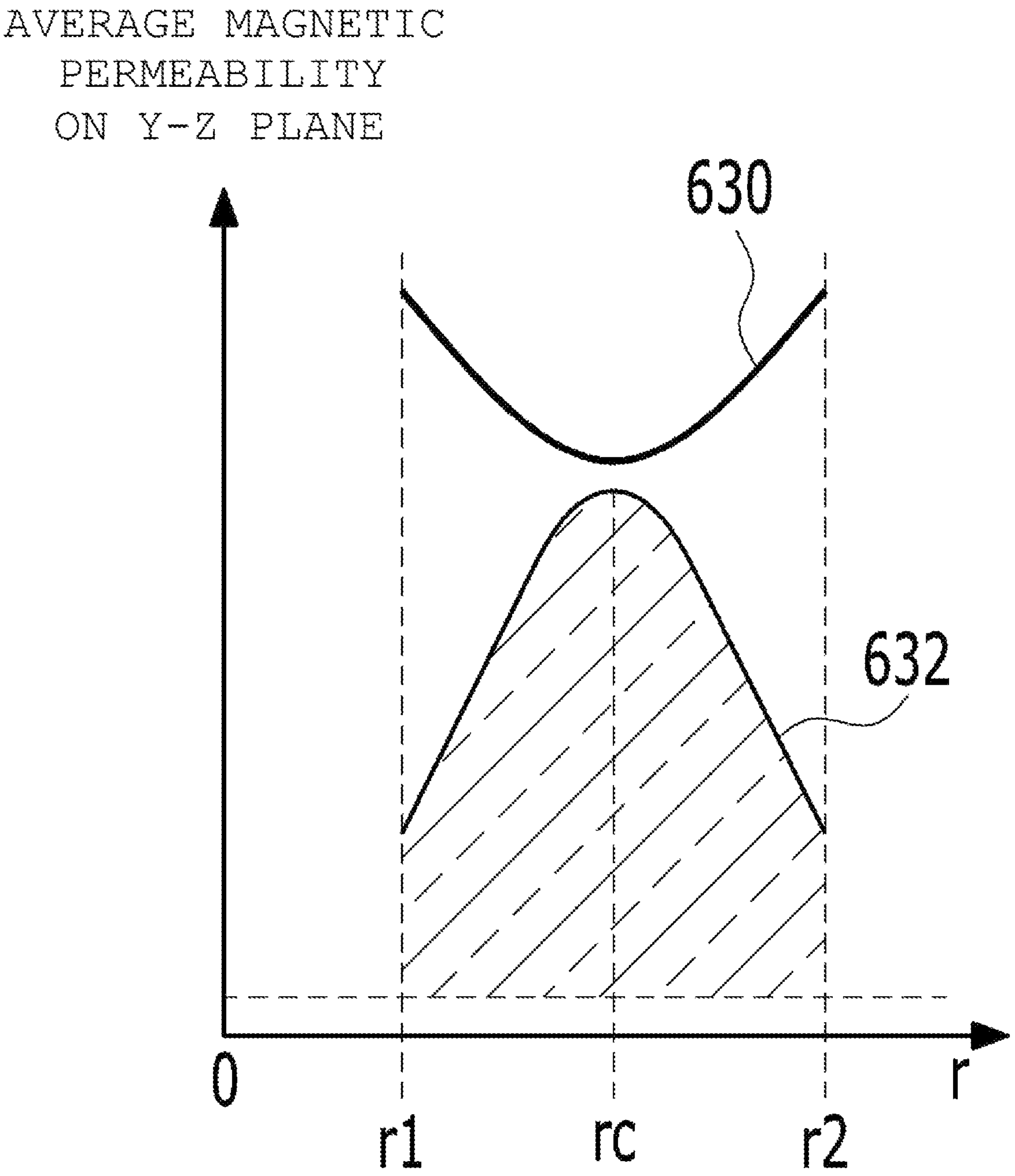
FIG. 33 is a graph showing an average magnetic permeability on the y-z plane in a differential mode of Embodiment 3 of the inductor.

FIG. 33 is a graph showing an average magnetic permeability on the y-z plane in a differential mode of Embodiment 3 of the inductor, wherein the horizontal axis represents a position in the radial (r) direction of the inductor and the vertical axis represents an average magnetic permeability on the y-z plane. In FIG. 33, reference numeral 630 represents an average magnetic permeability in a low-power mode, and reference numeral 632 represents an average magnetic permeability in a high-power mode.

Figure 34:
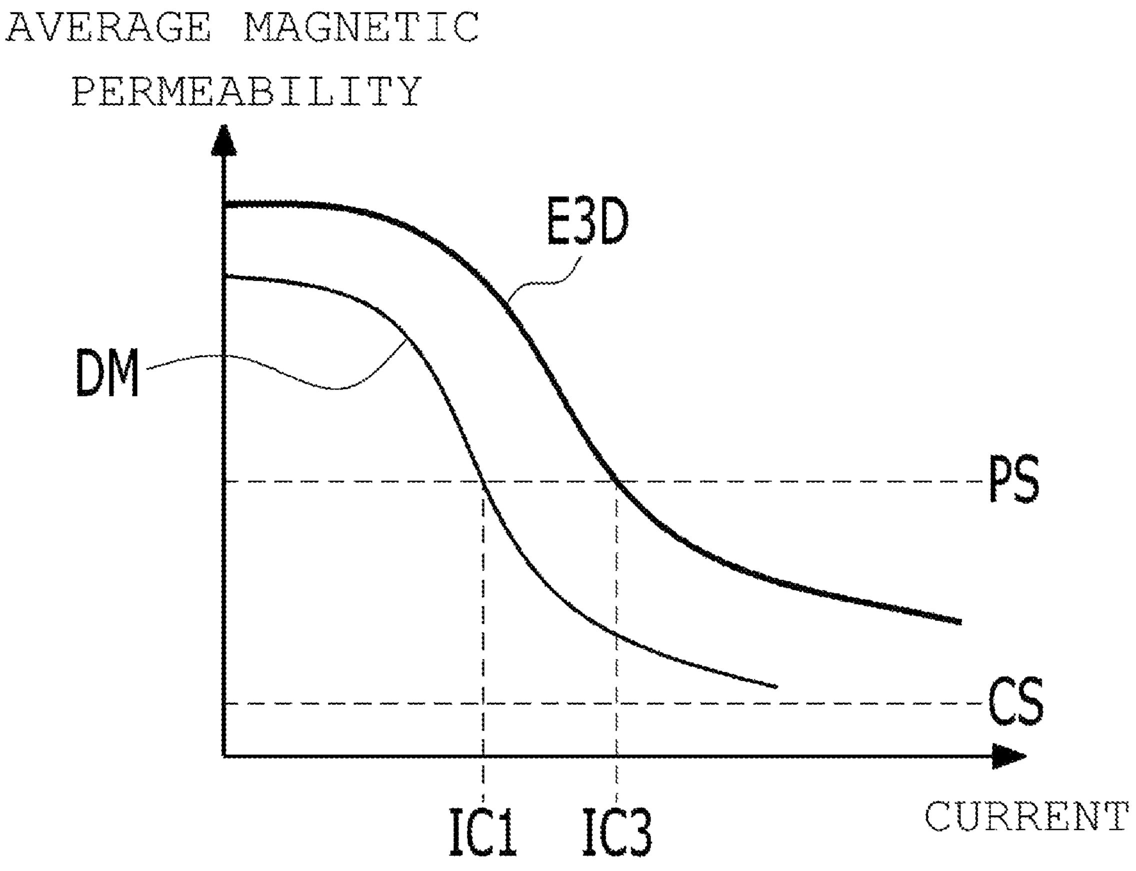
FIG. 34 is a graph showing an average magnetic permeability in a differential mode of Embodiment 3 of the inductor.

FIG. 34 is a graph showing an average magnetic permeability in a differential mode of Embodiment 3 of the inductor, wherein the horizontal axis represents current and the vertical axis represents an average magnetic permeability.

FIG. 33 shows a result obtained through line integration of the magnetic permeability, which is obtained at every time point, as illustrated in FIGS. 32A to 32C, in the circumferential direction of the inductor and structural average and time average of the line integration value when the frequency of the current applied to the inductor is in the range from 40 Hz to 70 Hz. FIG. 34 shows a result obtained through volume integration of the result value shown in FIG. 33 and time average of the volume integration value.

Referring to FIG. 34, as the applied current increases in a differential mode, the average magnetic permeability of Embodiment 3 of the inductor decreases. When the applied current is IC3, Embodiment 3 of the inductor reaches a partially saturated PS state in which the inductor loses 50% of the function thereof, and as the current continuously increases, the inductor reaches a completely saturated CS state in which the inductor loses 100% of the function thereof. Referring to FIG. 34, in a differential mode, the current (hereinafter referred to as "partial saturation current") at which the inductor according to the comparative example DM is partially saturated is IC1, and the partial saturation current of Embodiment 3 E3D of the inductor is IC3, which is greater than IC1. As such, in a differential mode, Embodiment 3 reaches a partially saturated state at a higher current value IC3 than the comparative example. Referring to FIG. 34, in the case in which the number n of turns of each of the first and second coils 1122 and 1124 is in the range from 10 to 50, when the average magnetic permeability reaches a value corresponding to the partial saturation in a differential mode, the applied current IC3 may range from 0.4 A to 10 A.

That is, in a differential mode, a reduction in the magnetic permeability in Embodiment 3 due to an increase in the applied current (i.e. an increase in the magnitude of the magnetic field) is lower than that in the comparative example. This is because Example 3 of the inductor includes the first magnetic body 810, which may be embodied as ferrite, and the second magnetic body 820 (822 and 824), which may be embodied as a nanoribbon having a higher magnetic permeability and a higher saturation magnetic flux density than the first magnetic body 810, and because the thickness TO of the first magnetic body 810 is greater than each of the thickness T1I of the inner magnetic body 824 and the thickness T1O of the outer magnetic body 822, based on a fact that magnetic energy is mainly concentrated on a material having a higher magnetic permeability. For example, when the number of turns of winding around each of the outer magnetic body 822 and the inner magnetic body 824 is in the range from 5 to 25, each of the thickness ratio (T1O:TO) between the outer magnetic body 822 and the first magnetic body 810 in the diameter direction of the first magnetic body 810 and the thickness ratio (T1I:TO) between the inner magnetic body 824 and the first magnetic body 810 in the diameter direction of the first magnetic body 810 may range from 1:80 to 1:16, preferably from 1:40 to 1:20. However, the disclosure is not limited thereto.

Therefore, compared to the comparative example, a reduction in the magnetic permeability in Embodiment 3 due to an increase in the current or an increase in the number of windings may be further prevented.

Next, the characteristics of Embodiment 3 of the inductor in a common mode will be described below.

Figure 35A:
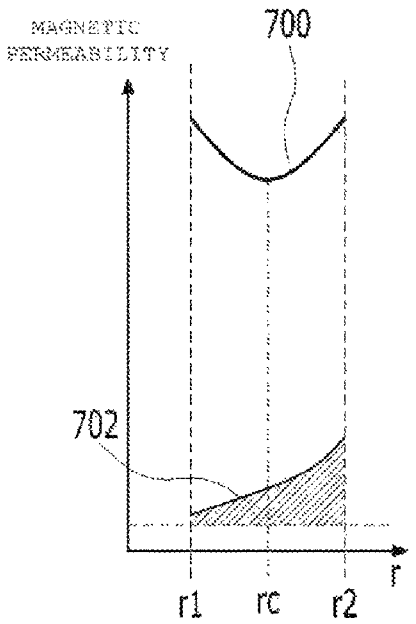
FIGS. 35A, 35B and 35C show the magnetic permeability (or relative permeability) of first, second and third sections, respectively, at a certain time point in a common mode of Embodiment 3 of the inductor.
Figure 35B:
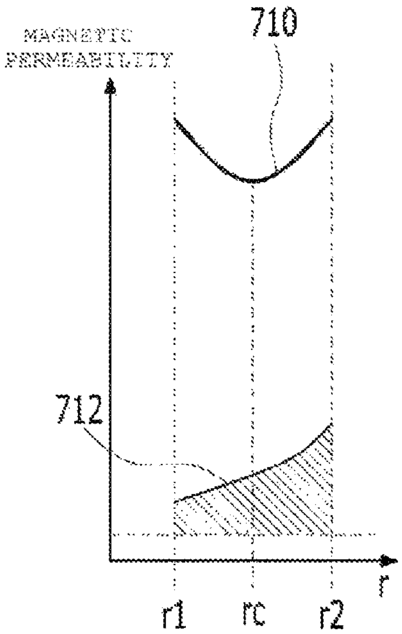
Figure 35C:
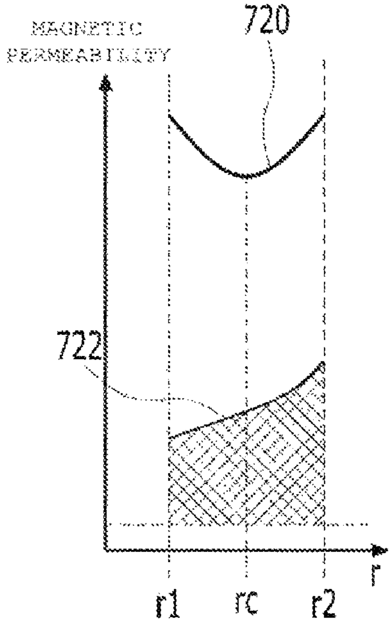

FIGS. 35A, 35B and 35C show the magnetic permeability (or relative permeability) of the first, second and third sections SE1, SE2 and SE3, respectively, at a certain time point in a common mode of Embodiment 3 of the inductor. Here, the magnetic permeability may be expressed by the above Equation 1.

In FIGS. 35A to 35C, reference numerals 700, 710 and 720 represent magnetic permeability in a low-power mode, and reference numerals 702, 712 and 722 represent magnetic permeability in a high-power mode. In FIGS. 35A to 35C, the horizontal axis represents a position in the radial (r) direction of the inductor.

Like the differential mode, referring to FIGS. 35A to 35C, in a low-power mode of a common mode, when the applied frequency of the applied current applied to the first and second coils 1122 and 1124 is less than a critical frequency, in any of the sections in a low-power mode, the first relative permeability of the first magnetic body 810, which is located at the center rc of the magnetic core, is less than the second relative permeability of the outer magnetic body 822, which is located at the outer portion r2 of the magnetic core, and is less than the third relative permeability of the inner magnetic body 824, which is located at the inner portion r1 of the magnetic core. On the other hand, when the frequency of the current applied to the first and second coils 1122 and 1124 is equal to or greater than the critical frequency, unlike the phenomenon shown in FIGS. 35A to 35C, each of the second relative permeability and the third relative permeability becomes less than the first relative permeability in any of the sections in a low-power mode.

In Embodiment 3 of the inductor, the magnetic permeability 702, 712 and 722 in a high-power mode gradually increases from the point r1 where the inner magnetic body 824 is located to the point r2 where the outer magnetic body 822 is located.

Like the differential mode, as the thickness T1O and T1I of each of the outer and inner magnetic bodies 822 and 824 decreases, the above-described critical frequency may increase. For example, when the thickness T1O and T1I of each of the outer and inner magnetic bodies 822 and 824 is in the range from 200 μm±10 μm (20 μm±1 μm and 10 turns) to 400 μm±10 μm (40 μm±1 μm and 10 turns), the critical frequency may range from 150 kHz to 250 kHz. For example, when the thickness T1O and T1I of each of the outer and inner magnetic bodies 822 and 824 is 200 μm±10 μm, the critical frequency may be 200 kHz.

The inductance LCM of Embodiment 3 of the inductor in a common mode may be expressed by the following Equation 4.

$$L_{CM} = \alpha\left(\mu_1 \frac{S_1}{LE_1} + \mu_{21} \frac{S_{21}}{LE_{21}} + \mu_{22} \frac{S_{22}}{LE_{22}}\right) \times \mu_0 \times n^2 \quad \text{[Equation 4]}$$

Here, α represents a coefficient, μ1 represents the first relative permeability of the first magnetic body 810, μ21 represents the second relative permeability of the outer magnetic body 822, μ22 represents the third relative permeability of the inner magnetic body 824, S1 represents the cross-sectional area of the first magnetic body 810, S21 represents the cross-sectional area of the outer magnetic body 822, and S22 represents the cross-sectional area of the inner magnetic body 824. Referring to FIG. 7B, each of S1, S21 and S22 may correspond to the cross-sectional area on the z-x plane. Referring to FIG. 18, LE1 is a circumferential length of the first magnetic body 810 about the center thereof, LE21 is a circumferential length of the outer magnetic body 822 about the center thereof, LE22 is a circumferential length of the inner magnetic body 824 about the center thereof, and n is the number of turns of each of the first and second coils 1122 and 1124.

Further, each of the first, second and third relative permeability μ1, μ21 and μ22 may vary depending on the applied frequency of the current applied to the inductor. When the number n of windings of each of the first and second coils 1122 and 1124 is 5 and when the thickness T1O and T1I of each of the outer and inner magnetic bodies 822 and 824 is 200 μm±10 μm (20 μm±1 μm and 10 turns), the first relative permeability μ1 may be 10,000 H/m, and each of the second and third relative permeability μ21 and μ22 may range from 2500 H/m to 200,000 H/m. For example, when the above-described critical frequency is 200 kHz, the first, second and third relative permeability μ1, μ21 and μ22 for each applied frequency may be as follows.

When the applied frequency is 10 kHz, the first relative permeability μ1 may be 10,000 H/m, and each of the second and third relative permeability μ21 and μ22 may range from 100,000 H/m to 200,000 H/m.

Alternatively, when the applied frequency is 100 kHz, the first relative permeability μ1 may be 10,000 H/m, and each of the second and third relative permeability μ21 and μ22 may range from 12,000 H/m to 15,000 H/m.

Alternatively, when the applied frequency is 200 kHz, the first relative permeability μ1 may be 10,000 H/m, and each of the second and third relative permeability μ21 and μ22 may range from 5,000 H/m to 15,000 H/m.

Alternatively, when the applied frequency is 300 kHz, the first relative permeability μ1 may be 10,000 H/m, and each of the second and third relative permeability μ21 and μ22 may range from 2,500 H/m to 7,500 H/m.

Figure 36:
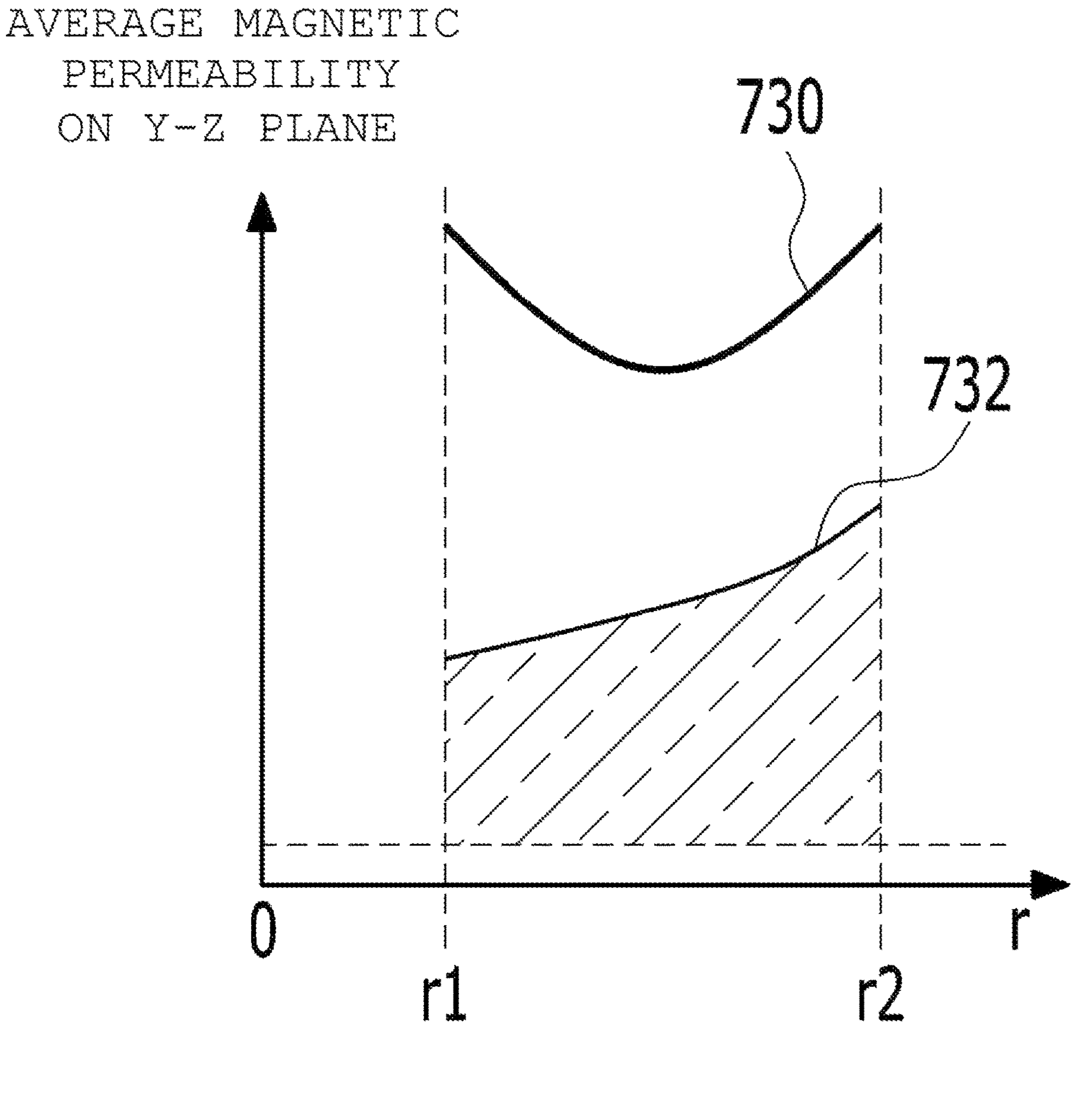
FIG. 36 is a graph showing an average magnetic permeability on the y-z plane in a common mode of Embodiment 3 of the inductor.

FIG. 36 is a graph showing an average magnetic permeability on the y-z plane in a common mode of Embodiment 3 of the inductor, wherein the horizontal axis represents a position in the radial (r) direction of the inductor and the vertical axis represents an average magnetic permeability on the y-z plane. In FIG. 36, reference numeral 730 represents an average magnetic permeability in a low-power mode, and reference numeral 732 represents an average magnetic permeability in a high-power mode.

Figure 37:
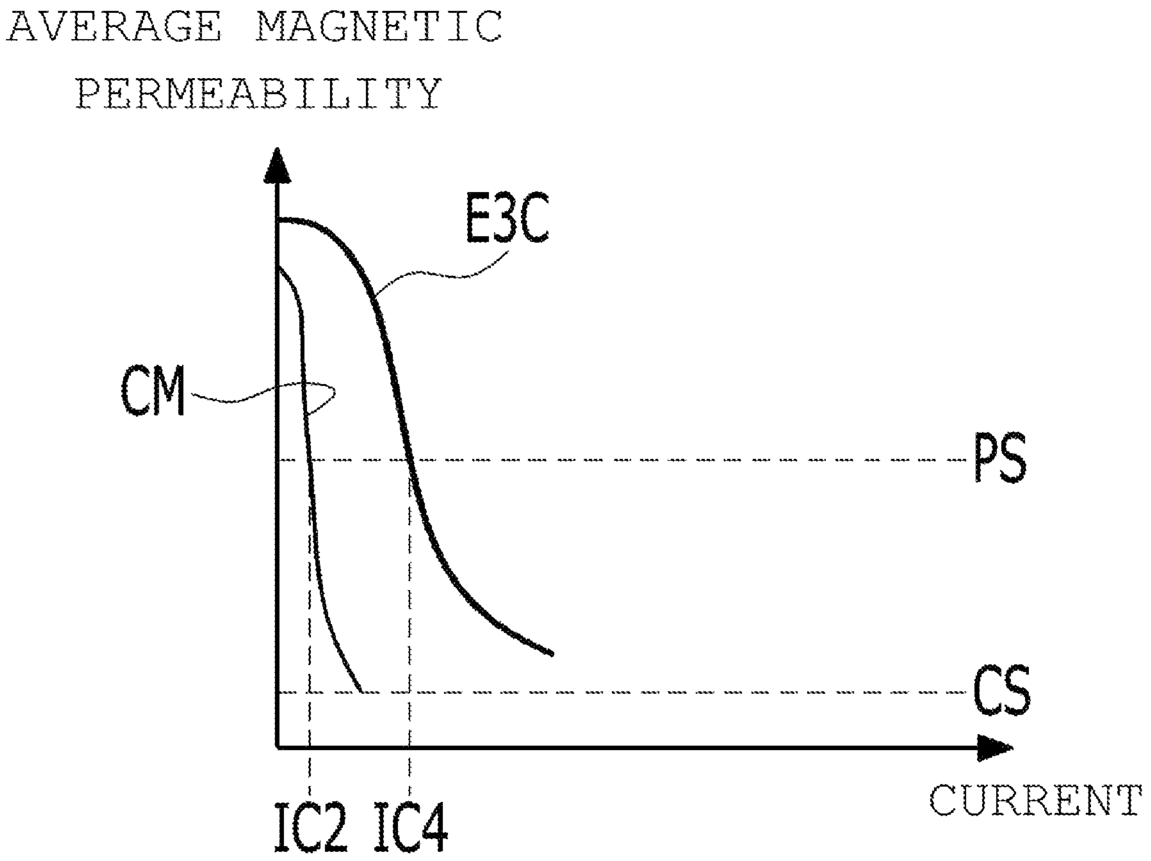
FIG. 37 is a graph showing an average magnetic permeability in a common mode of Embodiment 3 of the inductor.

FIG. 37 is a graph showing an average magnetic permeability in a common mode of Embodiment 3 of the inductor, wherein the horizontal axis represents current and the vertical axis represents an average magnetic permeability.

FIG. 36 shows a result obtained through line integration of the magnetic permeability, which is obtained at every time point, as illustrated in FIGS. 35A to 35C, in the circumferential direction of the inductor and structural average and time average of the line integration value. FIG. 37 shows a result obtained through volume integration of the result value shown in FIG. 36 and time average of the volume integration value.

Referring to FIG. 37, as the applied current increases in a common mode, the average magnetic permeability of Embodiment 3 of the inductor decreases. When the applied current is IC4, Embodiment 3 of the inductor reaches a partially saturated PS state in which the inductor loses 50% of the function thereof, and as the applied current continuously increases, the inductor reaches a completely saturated CS state in which the inductor loses 100% of the function thereof. Referring to FIG. 37, in a common mode, the partial saturation current of the inductor according to the comparative example CM is IC2, and the partial saturation current of Embodiment 3 E3C of the inductor is IC4, which is greater than IC2. As such, in a common mode, Embodiment 3 reaches a partially saturated state at a higher current value IC4 than the comparative example. That is, in a common mode, a reduction in the magnetic permeability in Embodiment 3 due to an increase in the applied current (i.e. an increase in the magnitude of the magnetic field) is lower than that in the comparative example.

Referring to FIG. 37, in the case in which the number n of turns of each of the first and second coils 1122 and 1124 is in the range from 10 to 50, the partial saturation current IC4 may range from 0.04 A to 1 A in a common mode.

In the differential mode and the common mode, as the number n of turns increases, the partial saturation current IC3 and IC4 may decrease in inverse proportion to the square n2 of the number n of turns. For example, when the number n of turns is 10, the partial saturation current IC3 in the differential mode may be about 10 A, and the partial saturation current IC4 in the common mode may be about 1 A. However, if the number n of turns is increased to 50, i.e. 5 times, the partial saturation current IC3 and IC4 may be reduced to 1/25. That is, the partial saturation current IC3 may be reduced to 0.4 A, and the partial saturation current IC4 may be reduced to 0.04 A.

Since Embodiment 3 of the inductor includes the second magnetic body 820, which is different from the first magnetic body 810, Embodiment 3 is capable of receiving high power in a differential mode. Further, since the second magnetic body 820 included in the magnetic core of Embodiment 3 of the inductor has a high saturation magnetic flux density and since the saturation magnetic flux density is maintained at a high frequency, some energy may be stored in the second magnetic body 820 even when reverse current is introduced. Therefore, even when a common mode is performed such that reverse current of 10 mA or lower is generated, it is possible to remove noise, thereby securing the stability of the circuit with respect to reverse current.

In Embodiment 3 of the inductor, the characteristics thereof in a common mode are similar to those in a differential mode. However, when reverse current (reflection) due to circuit impedance mismatch is introduced in a common mode, Embodiment 3 may convert the introduced reverse current into magnetic energy and may store the magnetic energy in the outer magnetic body 822 and the inner magnetic body 824. Therefore, when Embodiment 3 of the inductor is applied to an EMI filter to be described later, it is possible to remove noise and to prevent reverse current from being introduced into a power source.

A circuit, in which the inductor according to the embodiment is mainly utilized, may be configured to receive differential-type home AC current having a level of 90 V to 240 V and a frequency of 40 Hz to 70 Hz as main energy and may include a rectifier diode connected to a rear end thereof in the form of a Wheatstone bridge. In this case, the main energy has a low frequency and the noise source has a low power level, whereby it is possible to obtain the above-descried effects of the embodiment.

Meanwhile, the inductor according to the embodiment described above may be included in a line filter. For example, the line filter may be a line filter for noise reduction that is applied to an AC-to-DC converter.

Figure 38:
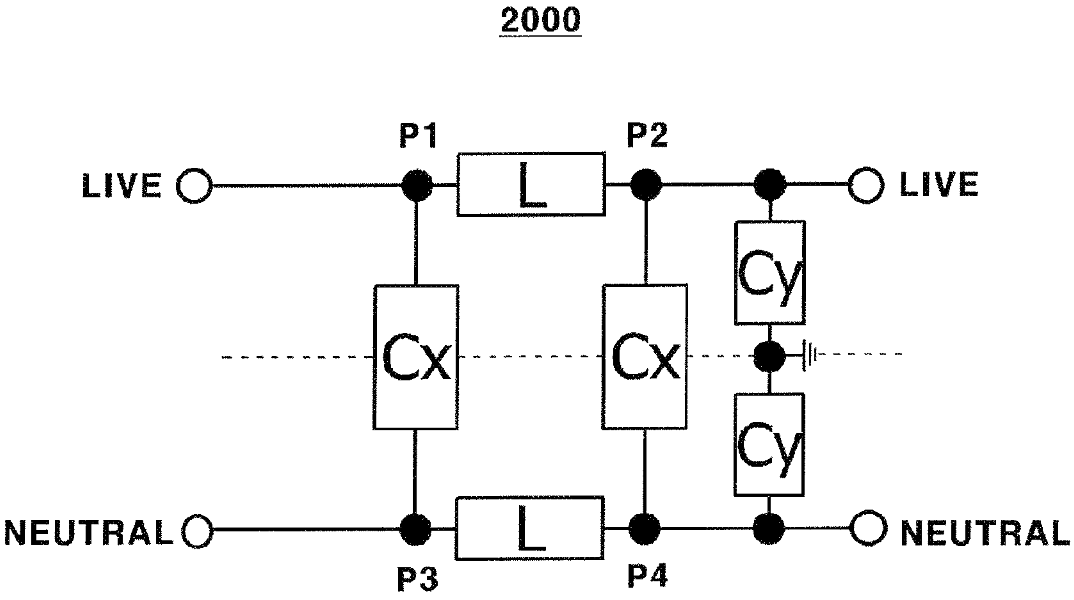
FIG. 38 is an embodiment of an EMI filter including an inductor according to an embodiment.

FIG. 38 is an embodiment of an EMI filter including the inductor according to the embodiment.

Referring to FIG. 38, an EMI filter 2000 may include a plurality of X-capacitors Cx, a plurality of Y-capacitors Cy, and inductors L.

The X-capacitors Cx are respectively disposed between a first terminal P1 of a live line LIVE and a third terminal P3 of a neutral line NEUTRAL and between a second terminal P2 of the live line LIVE and a fourth terminal P4 of the neutral line NEUTRAL.

The plurality of Y-capacitors Cy may be disposed in series between the second terminal P2 of the live line LIVE and the fourth terminal P4 of the neutral line NEUTRAL.

The inductors L may be disposed between the first terminal P1 and the second terminal P2 of the live line LIVE and between the third terminal P3 and the fourth terminal P4 of the neutral line NEUTRAL. Here, each of the inductors L may be the inductor 100 according to the embodiment described above.

When common-mode noise is introduced, the EMI filter 2000 removes the common-mode noise due to combined impedance characteristics of primary inductance and the Y-capacitors Cy. Here, the primary inductance of the live line LIVE may be obtained by measuring the inductance between the first terminal P1 and the second terminal P2 in the state of opening the third and fourth terminals P3 and P4, and the primary inductance of the neutral line NEUTRAL may be obtained by measuring the inductance between the third terminal P3 and the fourth terminal P4 in the state of opening the first and second terminals P1 and P2.

When differential-mode noise is introduced, the EMI filter 2000 removes the differential-mode noise due to combined impedance characteristics of leakage inductance and the X-capacitors Cx. Here, the leakage inductance of the live line LIVE may be obtained by measuring the inductance between the first terminal P1 and the second terminal P2 in the short-circuit state of the third and fourth terminals P3 and P4, and the leakage inductance of the neutral line NEUTRAL may be obtained by measuring the inductance between the third terminal P3 and the fourth terminal P4 in the short-circuit state of the first and second terminals P1 and P2.

The inductor of the EMI filter 2000 according to the embodiment may be the inductor according to Embodiment 3 described above. When the thickness T1O and T1I of each of the outer and inner magnetic bodies 822 and 824 of the second magnetic body 820 is 200 μm (20 μm±1 μm and 10 turns), the EMI performance may be further improved as the number n of turns of each of the first and second coils 1122 and 1124 increases. For example, because saturation occurs when the number n of turns is greater than 15, the most excellent EMI characteristics may be obtained when the number n of turns is 15.

Further, in order to remove common-mode noise, the inductance LCM in a common mode, which is expressed by the above Equation 4, needs to be large, and in order to remove differential-mode noise, the inductance LDM in a differential mode, which is expressed by the above Equation 3, needs to be large. Therefore, the inductor according to the embodiment may include the first and second magnetic bodies 810 and 820, which have S1, S21, S22, LE1, LE21 and LE22 determined based on the above principle. That is, since the relative permeability is not varied even when the number n of turns is varied, it is possible to maintain the inductance at a constant level by adjusting a ratio (S1/LE1, S21/LE21 and S22/LE22) of the cross-sectional area to the circumferential length.

The contents of the above-described embodiments may be applied to other embodiments as long as they are not incompatible with one another.

While the present disclosure has been particularly shown and described with reference to exemplary embodiments thereof, these embodiments are only proposed for illustrative purposes and do not restrict the present disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

Various embodiments have been described in the best mode for carrying out the disclosure.

An inductor according to embodiments may be used in various electronic circuits such as, for example, resonance circuits, filter circuits and power circuits, and an EMI filter may be applied to various digital or analog circuits that need noise removal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power board, comprising:

a board;

a circuit portion formed on the board; and an EMI filter configured to be electrically connected to the circuit portion, wherein the EMI filter comprises:

an inductor comprising:

a magnetic core; and a coil disposed on a surface of the magnetic core, and a capacitor, wherein the magnetic core comprises:

a first magnetic body having a toroidal shape, the first magnetic body comprising ferrite;

a second magnetic body disposed on an inner side of the first magnetic body; and a third magnetic body disposed on an outer side of the first magnetic body, wherein the second magnetic body is formed in multiple layers in a diameter direction of the first magnetic body on an inner circumferential surface of the first magnetic body, wherein the third magnetic body is formed in multiple layers in the diameter direction on an outer circumferential surface of the first magnetic body, wherein a thickness of the first magnetic body is greater than a thickness of the second magnetic body in the diameter direction, wherein a thickness of the third magnetic body is less than the thickness of the first magnetic body in the diameter direction, and wherein, when a frequency of a current applied to the inductor is equal to or less than a critical frequency, a relative permeability of each of the second and third magnetic bodies is higher than a relative permeability of the first magnetic body.

2. The power board according to claim 1, wherein the more the frequency of the current applied to the inductor approaches the critical frequency, the more a difference between the relative permeabilities of the first and second magnetic bodies decreases and the more a difference between the relative permeabilities of the first and third magnetic bodies decreases.

3. The power board according to claim 2, wherein, when the frequency of the current applied to the inductor is equal to or greater than the critical frequency, the relative permeability of each of the second and third magnetic bodies is lower than the relative permeability of the first magnetic body.

4. The power board according to claim 3, wherein the critical frequency ranges from 150 kHz to 250 kHz.

5. The power board according to claim 1, wherein a thickness ratio between the second magnetic body and the first magnetic body in the diameter direction ranges from 1:80 to 1:16, and wherein a thickness ratio between the third magnetic body and the first magnetic body in the diameter direction ranges from 1:80 to 1:16.

6. The power board according to claim 5, wherein the thickness of each of the second magnetic body and the third magnetic body ranges from 190 μm to 410 μm.

7. The power board according to claim 6, wherein each of the second magnetic body and the third magnetic body is wound in the range from 5 turns to 25 turns.

8. The power board according to claim 7, wherein at least one of the second or third magnetic body includes a region in which the thickness thereof varies in the diameter direction.

9. The power board according to claim 8, wherein each of the second magnetic body and the third magnetic body includes Fe—Si-based material.

10. The power board according to claim 1, wherein the relative permeability of the first magnetic body ranges from 2,000 H/m to 15,000 H/m, and wherein each of the relative permeability of the second magnetic body and the relative permeability of the third magnetic body ranges from 2,500 H/m to 150,000 H/m.

11. The power board according to claim 1, further comprising a resin layer disposed between the inner circumferential surface of the first magnetic body and the second magnetic body and between the outer circumferential surface of the first magnetic body and the third magnetic body.

12. The power board according to claim 11, wherein the multiple layers of the second magnetic body are integrally formed, and wherein the multiple layers of the third magnetic body are integrally formed.

13. The power board according to claim 1, wherein a height of at least one of the second or third magnetic body is different from a height of the first magnetic body in a direction perpendicular to the diameter direction.

14. The power board according to claim 13, wherein the height of the at least one of the second or third magnetic body is less than the height of the first magnetic body to expose at least one part of a surface of the first magnetic body.

15. The power board according to claim 1, wherein a saturation magnetic flux density of each of the second magnetic body and the third magnetic body is greater than a saturation magnetic flux density of the first magnetic body.

16. The power board according to claim 1, wherein the thickness of each of the second magnetic body and the third magnetic body in the diameter direction ranges from 190 μm to 210 μm.

17. The power board according to claim 1, wherein the outer side of the first magnetic body is adhered to the third magnetic body by a first adhesive, and wherein the inner side of the first magnetic body is adhered to the second magnetic body by a second adhesive.

18. The power board according to claim 17, wherein each of the first and second adhesives includes at least one of epoxy-based resin, acrylic resin, silicon-based resin, or varnish.

19. The power board according to claim 1, wherein the third magnetic body includes a plurality of areas having different numbers of the multiple layers.

20. A display device comprising the power board of claim 1.

* * * * *